United States Patent
Kaku et al.

[11] Patent Number: 5,963,593
[45] Date of Patent: Oct. 5, 1999

[54] LINE EQUALIZER CONTROL METHOD, AND INTEGRATING CIRCUIT, FREQUENCY SHIFT CIRCUIT AND TRANSMISSION DEVICE

[75] Inventors: Takashi Kaku; Noboru Kawada; Hideo Miyazawa; Yuri Nigaki, all of Kawasaki, Japan

[73] Assignee: Fujitsu Limited, Kanagawa, Japan

[21] Appl. No.: 08/825,067

[22] Filed: Mar. 27, 1997

[30] Foreign Application Priority Data

Mar. 29, 1996 [JP] Japan .................................. 8-076457
Jan. 13, 1997 [JP] Japan .................................. 9-004057

[51] Int. Cl.$^6$ .............................. H03H 7/40; H03H 5/00

[52] U.S. Cl. .................... 375/233; 375/232; 333/28 R

[58] Field of Search .................................. 375/230, 229, 375/232, 233; 333/28 R, 28 T, 18; 318/621; 335/32; 334/13

[56] References Cited

U.S. PATENT DOCUMENTS

| | | | |
|---|---|---|---|
| 3,758,881 | 9/1973 | Rummler | 375/230 |
| 3,763,359 | 10/1973 | Cho et al. | 333/18 |
| 4,003,006 | 1/1977 | Mandeville et al. | 333/18 |
| 4,801,900 | 1/1989 | Mower | 332/45 |

*Primary Examiner*—Stephen Chin
*Assistant Examiner*—Albert Park
*Attorney, Agent, or Firm*—Helfgott & Karas, P.C.

[57] ABSTRACT

A method of controlling a line equalizer such as a modem includes an extracting step of extracting plural tone signals each superimposed on a transmission signal and having a specific frequency component; a judging step of judging levels of the extracted tone signals; and a controlling step of controlling characteristic of a line equalizer which equalizes a receive signal, based on the levels of the judged tone signals. A line equalizer is controlled without performing an exchange of a training signal prior to starting a data transmission and without increasing the amount of hardware of a modem or the like.

14 Claims, 34 Drawing Sheets

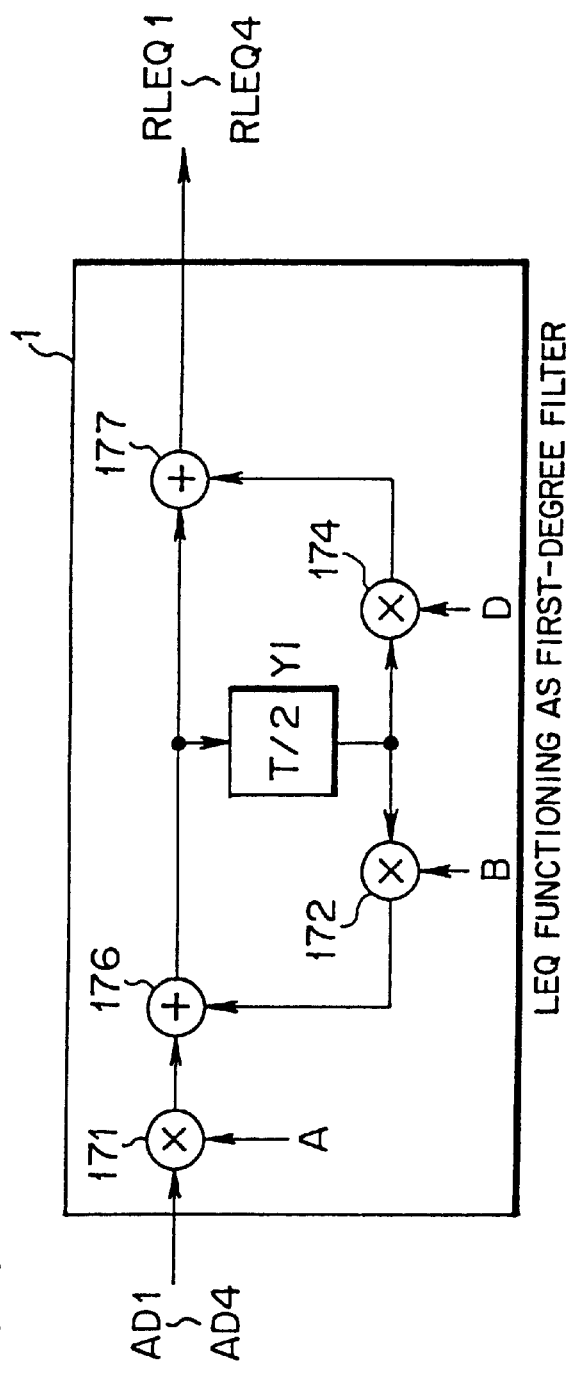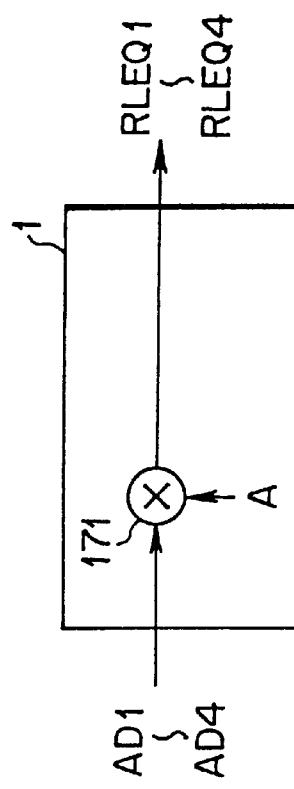
FIG.8(a) LEQ FUNCTIONING AS FIRST-DEGREE FILTER
FIG.8(b) LEQ FUNCTIONING AS 0-DEGREE FILTER +96 kHz SHIFT →

−96 kHz SHIFT ←

FIG. 18(a)
| PHASE | 96 kHz cosx | 96 kHz sinx | -96 kHz cosx | -96 kHz sinx |
|---|---|---|---|---|
| PHASE 0 | 1 | 0 | 1 | 0 |
| PHASE 1 | 0 | 1 | 0 | -1 |
| PHASE 2 | -1 | 0 | -1 | 0 |
| PHASE 3 | 0 | -1 | 0 | 1 |
FIG. 18(b)
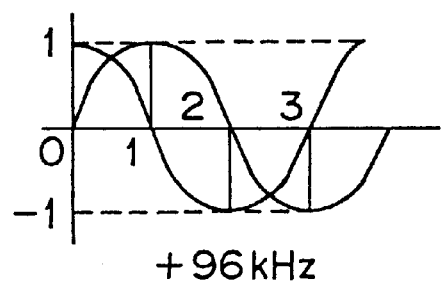
+96 kHz
FIG. 18(c)
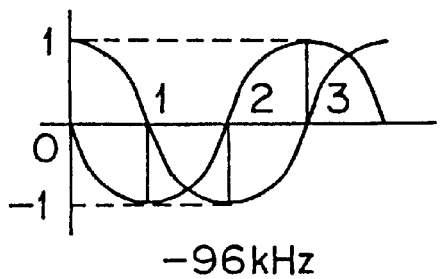
-96 kHz

FIG. 21

| DECIMAL | HEXADECIMAL | AND OPERATION ON [8000] | ADD [4000] | MULTIPLY BY [0001] |
|---|---|---|---|---|
| -2.0 ~ +0.0 | 7FFF ~ 0000 | 0000 ~ 0000 | 4000 ~ 4000 (+1.0) | 0001 ~ 0001 (+LSB) |
| -0.0 ~ -2.0 | FFFF ~ FFFF | 8000 ~ 8000 (-2.0) | C000 ~ C000 (-1.0) | FFFF ~ FFFF (-LSB) |

LINE EQUALIZER CONTROL METHOD, AND INTEGRATING CIRCUIT, FREQUENCY SHIFT CIRCUIT AND TRANSMISSION DEVICE

BACKGROUND OF THE INVENTION

1. Field of the Invention

The present invention relates to a transmission device suitable for use in transmitting data via metallic lines such as private branch lines or customer-owned lines, and to a line equalizer control method, an integrating circuit and a frequency shift circuit each used in the transmission device.

2. Description of the Related Art

Modems are generally used to transmit data via private branch lines or the like. Particularly, low-priced modems with high transmission rates have been strongly desired. High-speed modems having a transmission rate of, for example, about 1.5 Mbps higher than that of conventional data transmission modems have been required because image information includes a large volume of information.

FIG. 33 is a diagram showing the configuration of a general modem. The modem 280 shown in FIG. 33 exchanges data signals with an opposite modem via a trunk. The modem 280 includes a receiving section 281 which receives a data signal via a trunk and output it to a terminal or the like, and a transmission section 286 which transmits the data signal from the terminal to an opposite device via the trunk.

The transmission section 286 functionally includes a logic processing unit 286a, a roll-off filter (ROF) 286b, a modulator 286c, a digital/analog (D/A) converter 286d, and others. The receiving section 281 functionally includes an analog/digital (A/D) converter 281a, a line equalizer 281b, a demodulator 281c, a roll-off filter 281d, an automatic gain control unit (AGC) 281e, an automatic equalizer (EQL) 281f, a carrier detecting unit (CD) 281g, a timing extracting unit 281h, a clock signal generator 281i, and others.

As a hardware, the combination of the transmission section 286 and the receiving section 281 is formed of an A/D converter, a D/A converter, a MPU (Microprocessor Unit), and a DSP (Digital Signal Processor) which executes a digital signal process.

In such an arrangement, a training signal is transmitted to the opposite device before starting a data transmission, prior to data signal exchange between the modem 280 and an opposite modem. The so-called training process is performed based on the training signal to adjust the automatic gain control circuit (AGC) and the line equalizer (LEQ) or the like in the receiving modem. In this training process, a receive signal having an attenuated level and deteriorated frequency characteristic caused by the line characteristic is adjusted to a suitable condition.

Thereafter, in the transmission section 286 in the modem 280 shown in FIG. 33, a signal point is generated in a transmission data signal from, for example, a terminal through the process of the logic processing unit 286a. The roll-off filter 286b subjects the signal point to a waveform shaping process. The modulator 286c modulates the resultant signal point. Then the D/A converter 286d converts the modulated signal into an analog signal and then outputs it as a data signal.

In the receiving section 281 arranged in the modem 280, the A/D converter 281a converts analog receive data input from an opposite device via a trunk into a digital signal. Then the demodulator 281c demodulates the digital receive signal.

Thereafter, the roll-off filter 281d subjects the demodulated signal from the demodulator 281c to a waveform shaping process. Sequentially, the automatic gain control unit 281e controls automatically the gain of the receive signal from the rolloff filter 281d. The automatic equalizer 281f equalizes the signal from the automatic gain control unit 281e and then outputs the resultant signal to a receive terminal or the like.

In order to configure a communications system by connecting the above-mentioned modem to a metallic trunk such as a private branch line, it is needed to consider the frequency characteristic of a metallic trunk illustrated in FIG. 34. That is, the metallic trunk has the frequency characteristic of $1/\sqrt{f}$ shown in FIG. 34. The metallic trunk tends to distort the magnitude of a signal, particularly to more attenuate high frequency component in comparison with low frequency component.

When a receiving-side modem receives a data signal transmitted via a metallic trunk with the above-mentioned characteristic, the frequency characteristic of the receive signal in the receiving-side modem becomes $1/\sqrt{f}$. In the receiving section 281 arranged in the modem 280 shown in FIG. 33, the line equalizer 281b compensates the frequency characteristic of a receive signal changed due to the above-mentioned trunk characteristic. The line equalizer 281b can be formed of, for example, the above-mentioned DSP.

FIG. 35 is a diagram showing an example of the characteristic of the line equalizer 281b which equalizes the $1/\sqrt{f}$ frequency characteristic of the above-described receive signal. That is, the line equalizer 281b has a $\sqrt{f}$ characteristic to correct the frequency characteristic deterioration caused by the trunk shown in FIG. 34. This feature enables the frequency characteristic of a receive signal to be flattened.

As for the characteristic of the line equalizer 281b, it is needed to change the slope of the characteristic shown in FIG. 35 in terms of the condition of a trunk, or degree of distortion in the amplitude of a receive signal. It is desired that the line equalizer 281b can handle the characteristic ranging from a flat portion to a sharp portion. In order to accomplish such a demand, the conventional line equalizer has employed a second-degree high pass filter (HPF).

However, in the line equalizer 281b within the receiving section 281 arranged in the modem 280 shown in FIG. 33, it is needed to set the HPF tap coefficient to a very large value to realize flat characteristic by using a second-degree HPF.

In this case, since the fixed-point arithmetic operation cannot be adopted to the digital signal process as the line equalizer, the floating-point arithmetic operation is adopted thereto. That is, a DSP employing the floating-point arithmetic operation must be used for the line equalizer. However, using the DSP employing the floating-point arithmetic operation results in an increased manufacturing cost and decreased processing rate.

Hence, when a system is configured using a DSP employing the above-mentioned floating-point arithmetic operation, it becomes more important problem to deal with the high manufacturing cost and reduced processing rate, rather than realization of flat characteristic.

In order to perform a data transmission using the modem 280 shown in FIG. 33, a training signal is exchanged prior to starting the data transmission. Then the equalizer and the automatic gain control circuit are controlled based on the received training signal. For that reason, a considerable long period of time is needed for the training operation.

Specifically, in the communications system which includes plural modems connected in parallel on a receiving side to broadcast data from a transmission-side modem, the time for training is needed, so that it is impossible to start transmitting data immediately after trunk connection.

In recent years, it has been desired to make the period taken to start data transmission as short as possible. However, as described above, the problem is that training which is performed with receiving-side modems before the starting of data transmission prolongs the data transmission start time.

Moreover, in order to respond to a current desire for increasing the processing rate of a modem, it is desired to reduce the signal processing function of the DSP or the like to the utmost, with the signal processing function of a conventional modem maintained.

SUMMARY OF THE INVENTION

The present invention is made to overcome the above mentioned problems. An object of the present invention is to provide a line equalizer control method which enables a device to be configured at a low manufacturing cost and performs a line equalizing process at a high processing rate with a desired characteristic required according to a line condition.

Another object of the present invention is to provide an integrating circuit which enables a device to be configured at a low manufacturing cost and performs a line equalizing process at a high processing rate with a desired characteristic required according to a line condition.

Another object of the present invention is to provide a frequency shift circuit which enables a device to be configured at a low manufacturing cost and performs a line equalizing process at a high processing rate with a desired characteristic required according to a line condition.

Further object of the present invention is to provide a transmission device which enables a device to be configured at a low manufacturing cost and performs a line equalizing process at a high processing rate with a desired characteristic required according to a line condition.

Further object of the present invention is to provide a transmission device that can perform an automatic gain control without arranging a different automatic control circuit.

Still further object of the present invention is to provide a line equalizer control method and a transmission device which can control a line equalizer or the like without conducting training prior to starting a data transmission.

In order to achieve the above objects, according to the present invention, the line equalizer control method is characterized by an extracting step of extracting plural tone signals superimposed on a transmission signal, the plural tone signals each having a specific frequency component; a judging step of judging levels of the extracted tone signals; and a controlling step of controlling characteristic of a line equalizer which equalizes a receive signal, based on the levels of the judged tone signals.

According to the present invention, the line equalizer control method is characterized by the steps of extracting each of plural signals included in a receive signal, the plural signals each having a specific frequency component; calculating the level of a specific frequency signal component of each of the extracted signals; calculating a coefficient which decides the characteristic of a line equalizer based on the level of each of the calculated specific frequency signals; controlling the coefficient to be calculated based on the characteristic of a receive signal represented by the level of the specific frequency signal; and then switching the degree of the line equalizer.

Furthermore, according to the present invention, the transmission device which has a receiving section which receives as a receive signal a transmission signal to which plural tone signals each having a specific frequency component are superimposed, the receiving section is characterized by a line equalizer for equalizing the receive signal; and a line equalizer control unit for controlling the line equalizer in a feedback mode based on levels of the plural specific frequency signals included in an output signal from the line equalizer.

As described above, according to the present invention, the filter characteristic of a line equalizer or the like can be automatically controlled in the controlling step (or by the line equalizer control unit) to construct sequentially second-degree, first-degree, and zero-degree filters, based on the level of a specific frequency signal extracted from the receive signal Hence, the advantage is that the device can be constructed at low cost and that the line equalizing process can be performed with desired characteristic according to the condition of a trunk at a high processing rate. Specifically, since the degree of a line equalizer can be changed according to the characteristic of the receive signal, a DSP that can perform a fixed-point arithmetic operation at high speeds can be used at a relative low cost to realize a line equalizer.

Since the filter characteristic of the line equalizer can be changed by setting the coefficient thereof using both amplitude error information and frequency error information calculated based on a Nyquist frequency signal successively transmitted, the line equalizer can correct the amplitude error information and the frequency error information. Moreover, since it is possible to eliminate a necessity of exchanging a training signal before starting data transmission, the period ranging from a data transmission occurrence time to an actual data transmission start time can be shortened.

Furthermore, according to the present invention, the integrating circuit is characterized by a first extracting unit for extracting lower m digits from an n digit signal; a second extracting unit for extracting upper (n-n) digits from the n digit signal; a multiplier for halving a signal output from the second extracting unit; a first adder for adding an output from the first extracting unit to an output from the multiplier; a storage unit for temporarily storing the output from the first adder; and a second adder for adding a signal stored in the storage unit to an n digit signal to be input.

As described above, according to the present invention, an integrating circuit can be realized that extracts upper bits and lower bits of an n digit (−bit) signal and then adds a half of the upper bits to the lower bits, and then feeds back the result, whereby when exceeding a predetermined range, the integral value can be drawn back to the center point of the predetermined range. Hence, the variable width of an output signal can be suppressed to a suitable value by applying the integrating circuit to a receiving modem. As a result, the advantage is that the operation of the line equalizer can be stabilized.

Furthermore, according to the present invention, the frequency shift circuit is characterized by a first storage unit for temporarily storing a real component of an input signal and then outputting the same after one period of timing; a second storage unit for temporarily storing an imaginary component of the input signal and then outputting the same after one period of timing; a first adder for adding the real component input one period of timing before stored in the first storage unit to the imaginary component to be input; and a second adder for adding the imaginary component signal input one period of timing before stored in the second storage unit to the real component signal to be input.

As described above, since a frequency shift process can be performed through a simple signal operation including only adding the earlier signal to the later signal, the complicated signal process can be omitted. Thus, compared with the general frequency shift function, a more advantageous function can be realized from the viewpoint of the circuit scale, process time, and so on. Application of the frequency shift circuit to the modem contributes to a load decrease in the signal process of a DSP and a decrease in a process time. Compared with the general frequency shift function, more advantageous functions can be realized from the viewpoint of circuit scale, process time and so on.

BRIEF DESCRIPTION OF THE DRAWINGS

FIGS. 8(a) and 8(b) are diagrams each showing the equivalent circuit of the line equalizer in the data communications system according to the present embodiment;

FIGS. 18(a) to 18(c) are diagrams each for explaining operations of the major portion of the line equalizer control unit according to the present embodiment;

FIG. 21 is a diagram for explaining an operation of the major portion of the line equalizer control unit according to the present embodiment;

DESCRIPTION OF THE PREFERRED EMBODIMENT (a) Explanation of an Aspect of the Present Invention First, let us explain an embodiment of the present invention with reference to the attached drawings.

Figure 1:
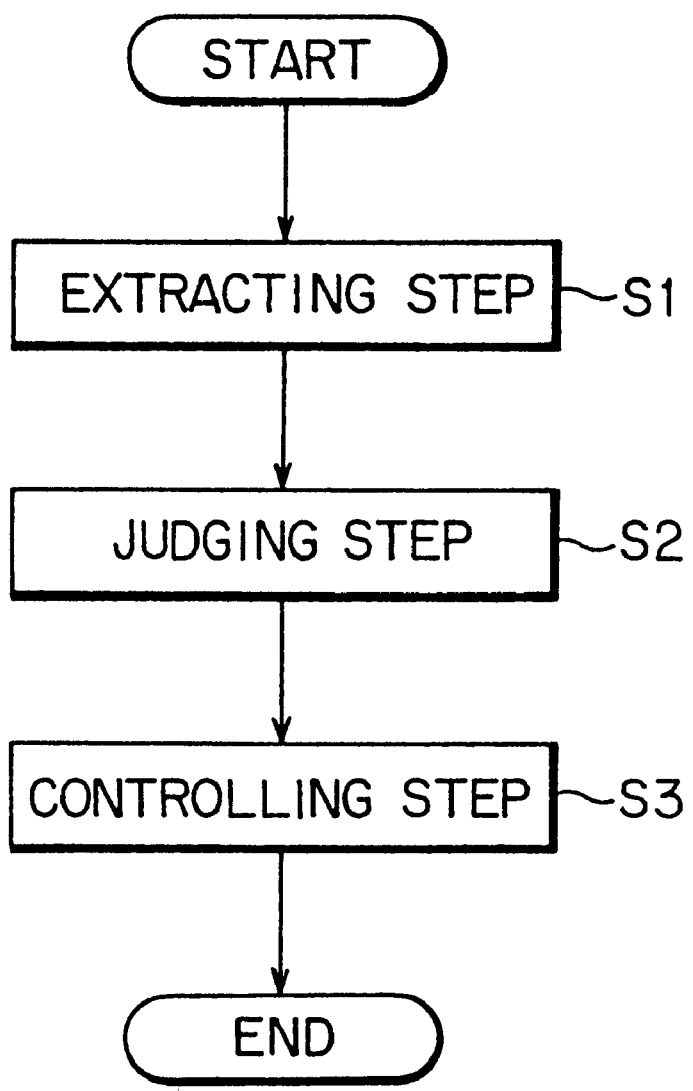
FIG. 1 is an explanatory diagram of an aspect of the present invention.

FIG. 1 is an explanatory diagram of an aspect of the present invention. Referring to FIG. 1, the line equalizer control method according to the present invention includes the following steps S1 to step S3. That is, in an extracting step (step S1), plural tone signals superimposed on a transmission signal are extracted. The plural tone signals each have a specific frequency component. In a judging step(step S2), levels of the extracted tone signals are judged. In a controlling step (step S3), the characteristic of a line equalizer which equalizes a receive signal is controlled based on the levels of the extracted tone signals.

Hence, according to the present invention, since the characteristic of the line equalizer can be automatically controlled based on the levels of specific frequency signals extracted from the receive signal in the controlling step (step S3), a device can be configured at a low manufacturing cost while a line equalizing process can be performed at a high processing rate with a desired characteristic required according to a line condition.

In that case, in the extracting step (step S1), the plural tone signals including a tone signal having an upper-limit frequency component in a certain band and a tone signal having a lower-limit frequency component in the band can be extracted.

Furthermore, a value obtained by adding the extracted plural signals together is compared with a reference value, in the judging step (step S2). Then the characteristic of the line equalizer can be controlled based on the value and the magnitude thereof obtained by comparing the tone signals with the reference value and the values thereof, in the controlling step (step S3). Moreover, differences in levels between the extracted plural tone signals is calculated in the judging step (step S2). Then the characteristic of the line equalizer can be controlled based on the values of the level differences and the polarities thereof, in the controlling step (step S3).

Hence, according to the present invention, since the filter characteristic of the line equalizer can be changed by setting the coefficient thereof by using both amplitude error information and frequency error information calculated based on a Nyquist frequency signal successively transmitted, the line equalizer can correct the amplitude error information and the frequency error information. Moreover, it is possible to eliminate a necessity of exchanging a training signal before starting data transmission, the period ranging from a data transmission request occurrence time to an actual data transmission start time can be shortened.

Furthermore, according to the present invention, the line equalizer control method is characterized by the steps of extracting each of plural signals included in a receive signal, the plural signals each having a specific frequency component; calculating the level of a specific frequency signal component of each of the extracted signals; calculating a coefficient which decides the characteristic of the line equalizer based on the level of each of the specific frequency signals calculated; controlling the coefficient to be calculated based on the characteristic of a receive signal represented by the level of the specific frequency signal; and then switching the degree of the line equalizer.

Hence according to the present invention, the filter characteristic of the line equalizer or the like can be automatically controlled to construct sequentially second-degree, first-degree, and zero-degree filters, based on the level of the specific frequency signal extracted from the receive signal. Hence, the advantage is that the line equalizing process can be performed with desired characteristic according to a condition of a trunk. Specifically, since the degree of the line equalizer can be changed according to the characteristic of a receive signal, there is an advantage in that a DSP or the like that can perform a fixed-point arithmetic operation at high speeds can be used at a relatively low cost to realize the line equalizer.

Since the filter characteristic of the line equalizer can be changed by setting the coefficient thereof by using both amplitude error information and frequency error information calculated based on a Nyquist frequency signal successively transmitted, the line equalizer can correct the amplitude error information and the frequency error information. Moreover, it is possible to eliminate a necessity of exchanging a training signal before starting data transmission, the period ranging from a data transmission request occurrence time to an actual data transmission start time can be shortened.

Moreover, according to the present invention, the integrating circuit is characterized by a first extracting unit for extracting lower m digits from an n digit signal; a second extracting unit for extracting upper (n–m) digits from the n digit signal; a multiplier for halving a signal output from the second extracting unit; a first adder for adding an output from the first extracting unit to an output from the multiplier; a storage unit for temporarily storing the output from the first adder; and a second adder for adding a signal stored in the storage unit to an n digit signal to be input.

Hence, according to the present invention, an integrating circuit can be realized that extracts upper bits and lower bits of an n digit (–bit) signal and then adds a half of the upper bits to the lower bits, and then feeds back the result, whereby when exceeding a predetermined range, the integral value can be drawn back to the center point of the predetermined range. Hence, the variable width of an output signal can be suppressed to a suitable value by applying the integrating circuit to a receiving modem. As a result, the advantage is that the operation of the line equalizer can be stabilized.

According to the present invention, the frequency shift circuit is characterized by a first storage unit for temporarily storing a real component of an input signal and then outputting the same after one period of timing; a second storage unit for temporarily storing an imaginary component of the input signal and then outputting the same after one period of timing; a first adder for adding the real component signal input one period of timing before stored in the first storage unit to the imaginary component signal already input; and a second adder for adding the imaginary component input one period of timing before stored in the second storage unit to the real component signal already input.

According to the present invention, since a frequency shift process can be performed through a simple signal operation including only adding the earlier signal to the later signal, the complicated signal process can be omitted. Thus, compared with the conventional frequency shift function, a more advantageous function can be realized in the circuit scale, process time, and so on. Application of the frequency shift circuit to the modem contributes to a load decrease in the signal process of a DSP and a decrease in a process time. Compared with the conventional frequency shift function, more advantageous functions can be realized in the circuit scale, process time and so on.

Figure 2:
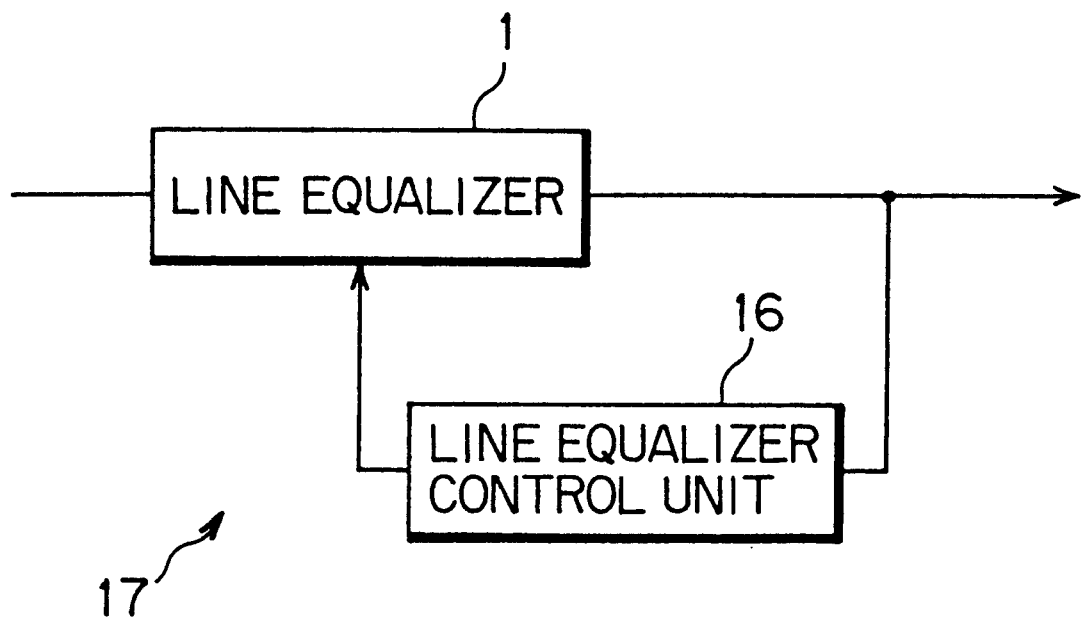
FIG. 2 is a block diagram showing an aspect of the present invention.

FIG. 2 is a block diagram showing an aspect of the present invention. Referring to FIG. 2, numeral 17 represents a transmission device having a receiving section 10 which receives as a receive signal a transmission signal on which plural tone signals having a specific frequency component are superimposed. The receiving section 10 consists of a line equalizer 1 and a line equalizer control unit 16.

The line equalizer 1 equalizes a receive signal. The line equalizer control unit 16 feed-back controls the line equalizer 1 based on levels of plural specific frequency signals included in an output signal from the line equalizer 1.

Moreover, the line equalizer control unit 16 includes a bandpass filter unit for extracting a signal having a specific frequency component from an output signal from the line equalizer 1; a level calculating unit for calculating levels of each of the plural specific frequency signals extracted by the bandpass filter unit; and a coefficient calculating unit for calculating a coefficient deciding the characteristic of the line equalizer 1 based on the signal level calculated by the level calculating unit.

The line equalizer 1 may be formed so as to operate as a second-degree, first-degree, or zero-degree filter under feedback control by the line equalizer control unit 16. The line equalizer control unit 16 may be formed so as to perform an automatic gain control regarding the receive signal, through a feedback control on the line equalizer 1.

The transmission device may be further formed of a random extracting circuit arranged at the front stage of the line equalizer control unit 16, for randomly extracting an output signal from the line equalizer 1.

The bandpass filter unit can be formed of a bandpass filter for extracting plural specific frequency signals from a receive signal; a frequency shift unit for shifting the plural specific frequency signals extracted by the bandpass filter by a predetermined frequency component; and a low-pass filter for extracting at least one of the plural specific frequency signals from the frequency shift unit.

In this case, the combination of the frequency shift unit and the low-pass filter can be formed of a frequency shift low-pass filter sharing unit including a first storage unit for temporarily storing a real component of an input signal and then outputting it after one period of timing; a second storage unit for temporarily storing an imaginary component of the input signal and then outputting it after one period of timing; a first adder for adding the real component of one period of timing before stored in the first storage unit to the imaginary component signal; and a second adder for adding the imaginary component signal of one period of timing before stored in the second storage unit to the real component signal.

The level calculating unit can be formed of a full-power calculating unit for calculating the level of an intermediate band signal in transmission data by calculating the sum of plural specific frequency signals extracted by the bandpass filter unit; and a power differential calculating unit for calculating the power difference between plural specific frequency signals extracted by the bandpass filter unit.

Further, the coefficient calculating unit can be formed of a comparing unit for comparing power information of a signal level calculated by the level calculating unit with a reference value set in advance; an integrating unit for integrating a comparison result from the comparing unit; and a limiter for calculating a coefficient to control the line equalizer, based on an integration result from the integrating unit.

The integrating unit in the coefficient calculating unit can be formed of a first extracting unit for extracting lower m digits from an n digit signal; a second extracting unit for extracting upper (n−m) digits from the n digit signal; a multiplier for halving a signal output from the second extracting unit; a first adder for adding an output from the first extracting unit to an output from the multiplier; a storage unit for temporarily storing the output from the first adder; and a second adder for adding the signal stored in the storage unit to an n digit signal to be input.

Hence, according to the transmission device of the present invention, the line equalizer control unit can automatically control the filter characteristic of the line equalizer or the like to construct sequentially second-degree, first-degree, and zero-degree filters, based on the level of the specific frequency signal extracted from the receive signal. Hence, the advantage is that the device can be constructed at low cost and that the line equalizing process can be performed at a high processing rate with desired characteristic according to the condition of a trunk. Specifically, since a degree of the line equalizer can be changed according to the characteristic of the receive signal, there is an advantage in that a DSP can perform a fixed-point arithmetic operation at high speeds can be used at a relative low cost to realize a line equalizer.

According to the present invention, since the coefficient calculating unit can change the characteristic of the line equalizer by setting the coefficient thereof using both amplitude error information and frequency error information calculated based on a Nyquist frequency signal successively transmitted, the line equalizer can correct the amplitude error information and the frequency error information. Moreover, since it is possible to eliminate a necessity of exchanging a training signal before starting data transmission, the period ranging from a data transmission request occurrence time to an actual data transmission start time can be shortened.

According to the present invention, by using plural specific frequency signals (tone signals) extracted from the receive signal, the line equalizer control unit calculates the average value of the levels of them so that the degree of attenuation of the receive signal can be verified. Moreover, the frequency characteristic of the receive signal can be identified by calculating the difference in levels among the specific frequency signals. As a result, the automatic adjustment of a line equalizer can be greatly simplified.

According to the present invention, the amplitude of an input signal can be controlled by multiplying a signal having a value corresponding to an amplitude error by the input signal, whereas it is not needed to arrange an AGC circuit. Hence, the advantage is that the process load on a DSP can be reduced by simplifying the circuit configuration.

Further, the present invention has the advantage in that an integrating circuit which can pull back an integration value to the center point in the above-described range when it exceeds a predetermined value can be realized by respectively extracting the upper bits and the lower bits of an n digit (bit) signal, by adding one half of the upper bits to the lower bits, and then by feeding back the result. The integrating circuit embodied in a receiving modem can suppress the varied width of an output signal to a suitable value, thus stabilizing the operation of the line equalizer.

According to the present invention, since the frequency shift and low-pass filter sharing unit can carry out a frequency shift process through a simple signal operation including only adding the earlier signal to the later signal, the complicated signal process can be omitted. Thus, compared with the general frequency shift function, a more advantageous function can be realized in the circuit scale, process time, and so on. Application of the frequency shift circuit to the modem contributes to a load decrease in the signal process of a DSP and a decrease in a process time. Compared with the general frequency shift function, more advantageous functions can be realized in the circuit scale, process time and so on.

(b) Explanation of an Embodiment of the Present Invention

An embodiment of the present invention will be described below by referring to the attached drawings.

Figure 5:
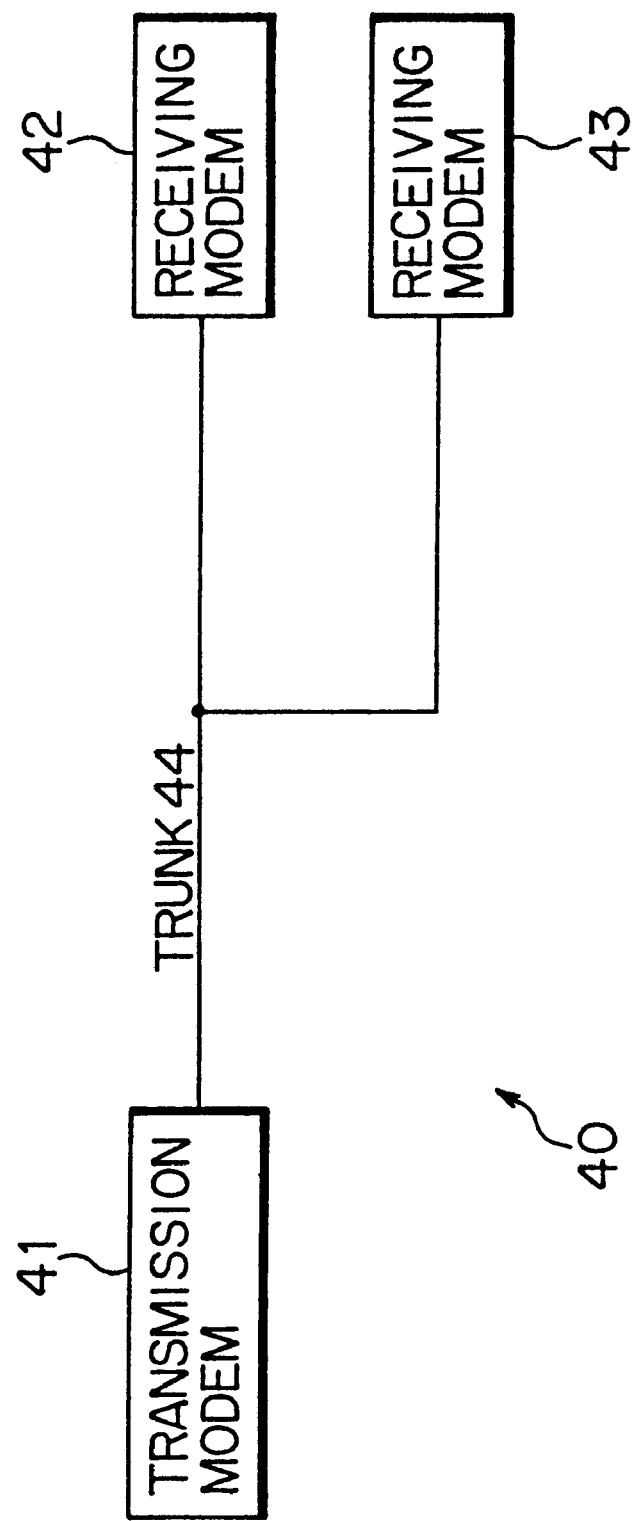
FIG. 5 is a block diagram showing a data communications system adopting the modem acting as a transmission device according to the embodiment of the present invention.

FIG. 5 is a block diagram showing a data communications system employing a modem acting as a transmission device according to the embodiment of the present invention. In the data communications system 40 shown in FIG. 5, a transmission modem 41 is connected to plural (e.g. two) receiving modems 42 and 43 arranged in parallel via a metallic trunk 44 such as a private trunk.

That is, in the data communications system 40, the transmission data 41 can transmit various data of a transmission rate of 1.5 Mbps from the transmission modem 41 to the receiving modems 42 and 43 via the metallic trunk 44. Data including a large volume of information such as image information can be broadcast between the transmission modem 41 and the receiving modems 42 and 43.

For example, when a television conference system or a system which confirms a condition of a spot of a traffic accident at a remote place is configured, the data communications system 40 shown in FIG. 5 can broadcast necessary image information (transmit in parallel image information of the same contents).

In other words, in the data communications system 40 shown in FIG. 5, image data is transmitted from a host device (not shown) to various receiving terminals via the transmission modem 41 by connecting the host device to the transmitting modem 41 and connecting the various receiving terminals to the receiving modems 42 and 43. The transmission modem 41 subjects the transmission data from the host device to a necessary modulation process and then transmits the modulated data to the various receiving terminals via the metallic trunk 44 and the receiving modems 42 and 43. In this arrangement, the various receiving terminals can simultaneously receive the transmission data from the transmission modem 41.

Figure 4:
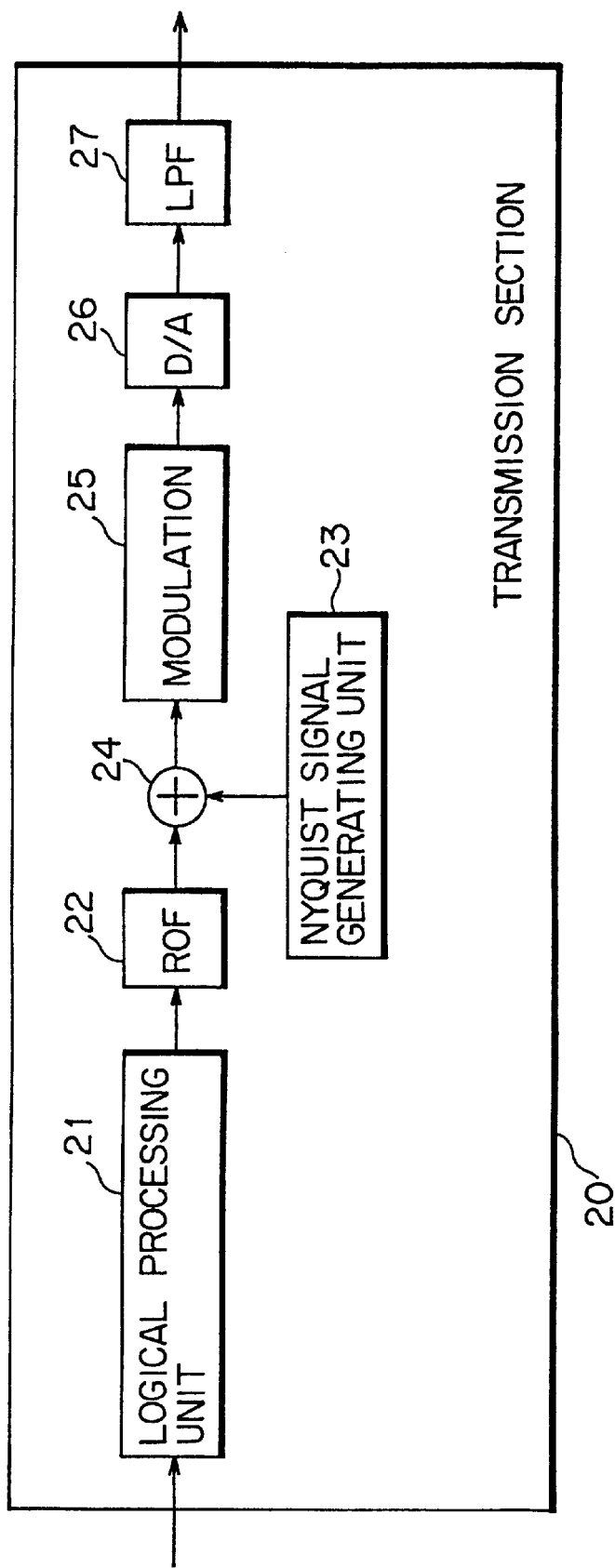
FIG. 4 is a block diagram showing a transmission section in the modem according to the embodiment of the present invention.

The transmission modem 41 shown in FIG. 5 includes, for example, a transmission section 20 shown in FIG. 4.

Referring to FIG. 4, the transmission section 20 consists of a logic processing unit 21, a roll-off filter (ROF) 22, a Nyquist signal generating unit 23, an adder 24, a modulator 25, a D/A converter 26, and a low-pass filter (LPF) 27.

In the transmission section 20, the logic processing unit 21 is formed of, for example, an MPU. The combination of a roll-off filter 22, a Nyquist frequency generating unit 23, an adder 24, and a modulator 25 is formed of a DSP.

The logic processing unit 21 executes a logic process such as a gray code/natural code conversion and a process in generation of a signal point corresponding to transmission data. The roll-off filter 22 shapes a waveform of a transmission signal from the logic processing unit 21.

Moreover, the Nyquist frequency signal generating unit 23 generates a signal having a Nyquist frequency component. The adder 24 adds the output of the roll-off filter 22 to the Nyquist frequency component generated in the Nyquist frequency signal generating unit 23.

The modulator 25 modulates transmission data by a predetermined modulating method. The D/A converter 26 converts modulated digital transmission data into an analog signal and then transmits the resultant signal to a metallic trunk or the like.

The low-pass filer 27 removes noises on a band outside a used band. The signal output from the low-pass filter 27 is transmitted to a receiving-side modem via the metallic trunk 44.

Figure 6:
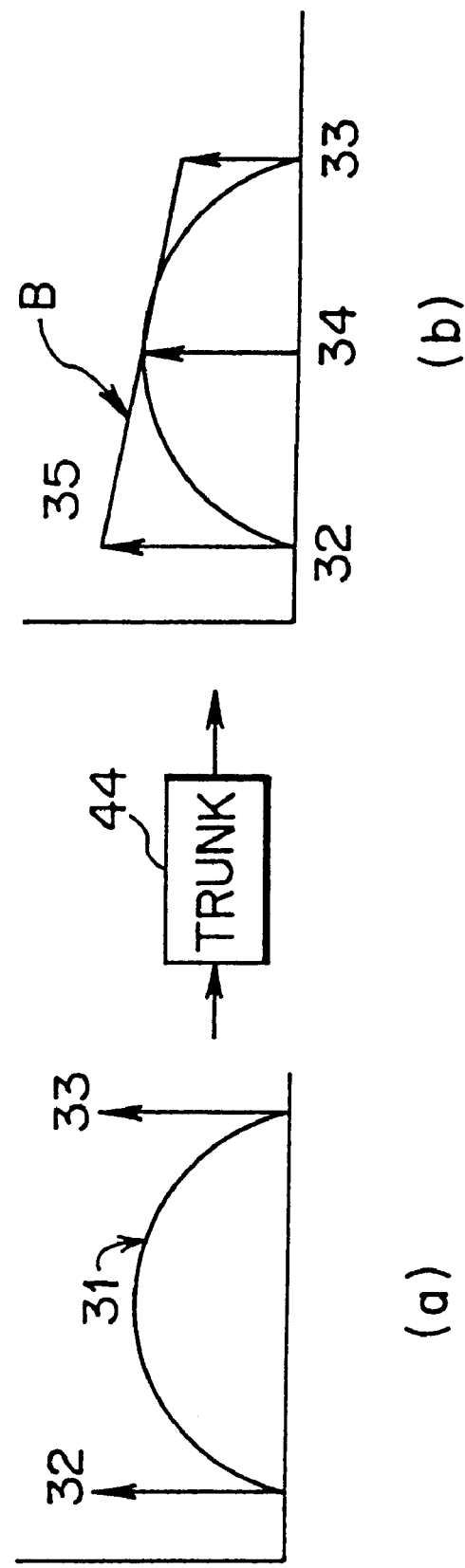
FIG. 6 is a diagram showing a frequency spectrum of a transmission signal and the frequency spectrum of a receive signal in the data communications system according to the present embodiment.

In the transmission section 20, as shown in (a) of FIG. 6, both a tone signal (12 kHz) 32 and a tone signal (204 kHz) 33 each having a Nyquist frequency, for example, are superimposed on transmission data (of a transmission rate of 1.5 Mbps) 31 having a specific band (12 kHz to 204 kHz). Then the resultant signal is transmitted to the metallic trunk 44.

Here, the tone signal 32 to be superimposed on the transmission data 31 is a tone signal having a lower-limit frequency component in the band of the transmission data 31. The tone signal 33 to be superimposed on the transmission data 31 is a tone signal having an upper-limit frequency component in the band of the transmission data 31.

Figure 3:
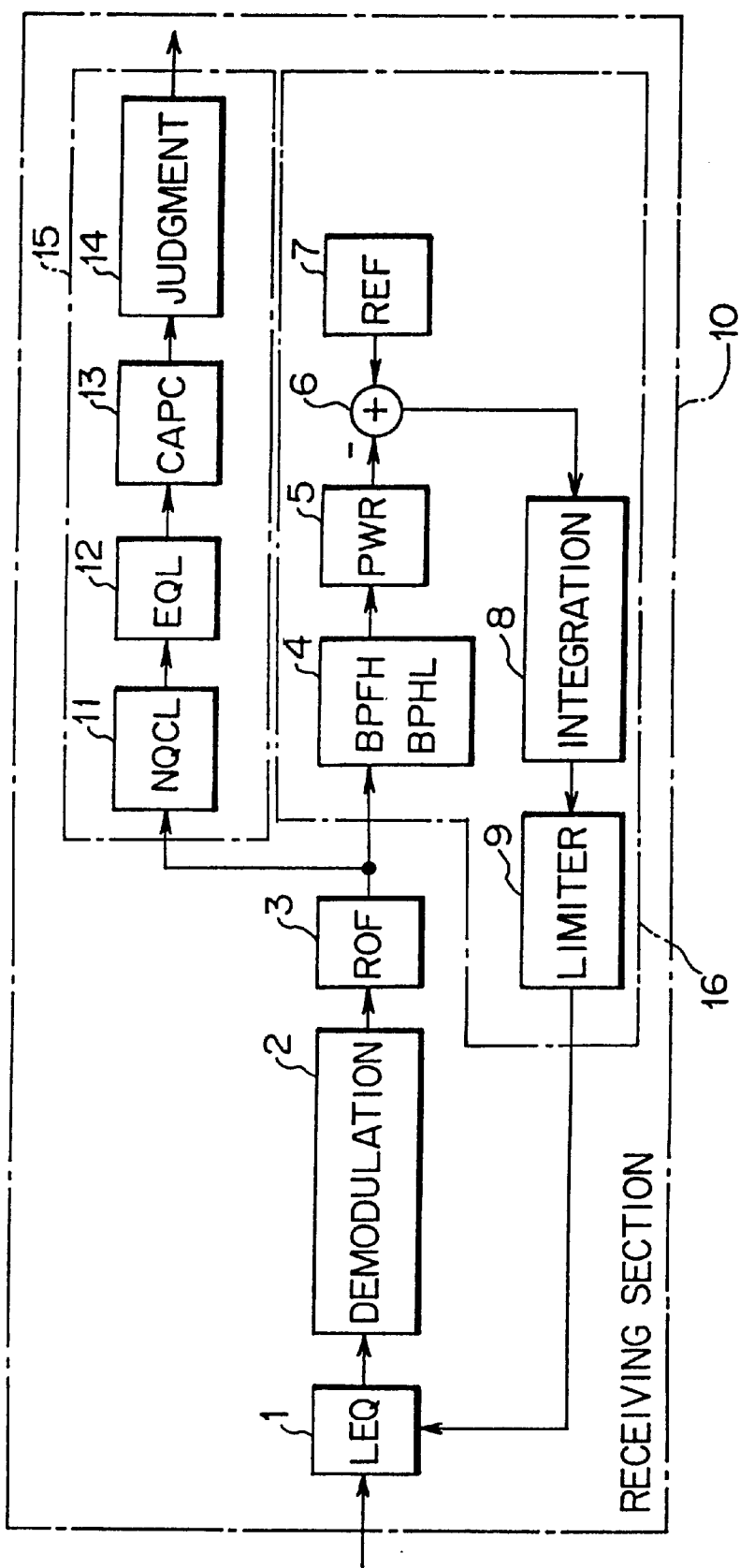
FIG. 3 is a block diagram showing a receiving section in a modem according to an embodiment of the present invention.

Each of the receiving modems 42 and 43 shown in FIG. 5 includes, for example, the receiving section 10 shown in FIG. 3.

The receiving section 10 shown in FIG. 3 includes a line equalizer 1, a demodulator 2, a roll-off filter 3, a receive signal processing unit 15, and a line equalizer control unit 16.

The line equalizer (LEQ) 1, which is arranged in the rear stage of an analog(digital converter (not shown) for converting an analog signal received through a trunk into a digital signal, compensates amplitude distortion due to the characteristic of a metallic trunk under control by the line equalizer control unit 16.

Figure 7:
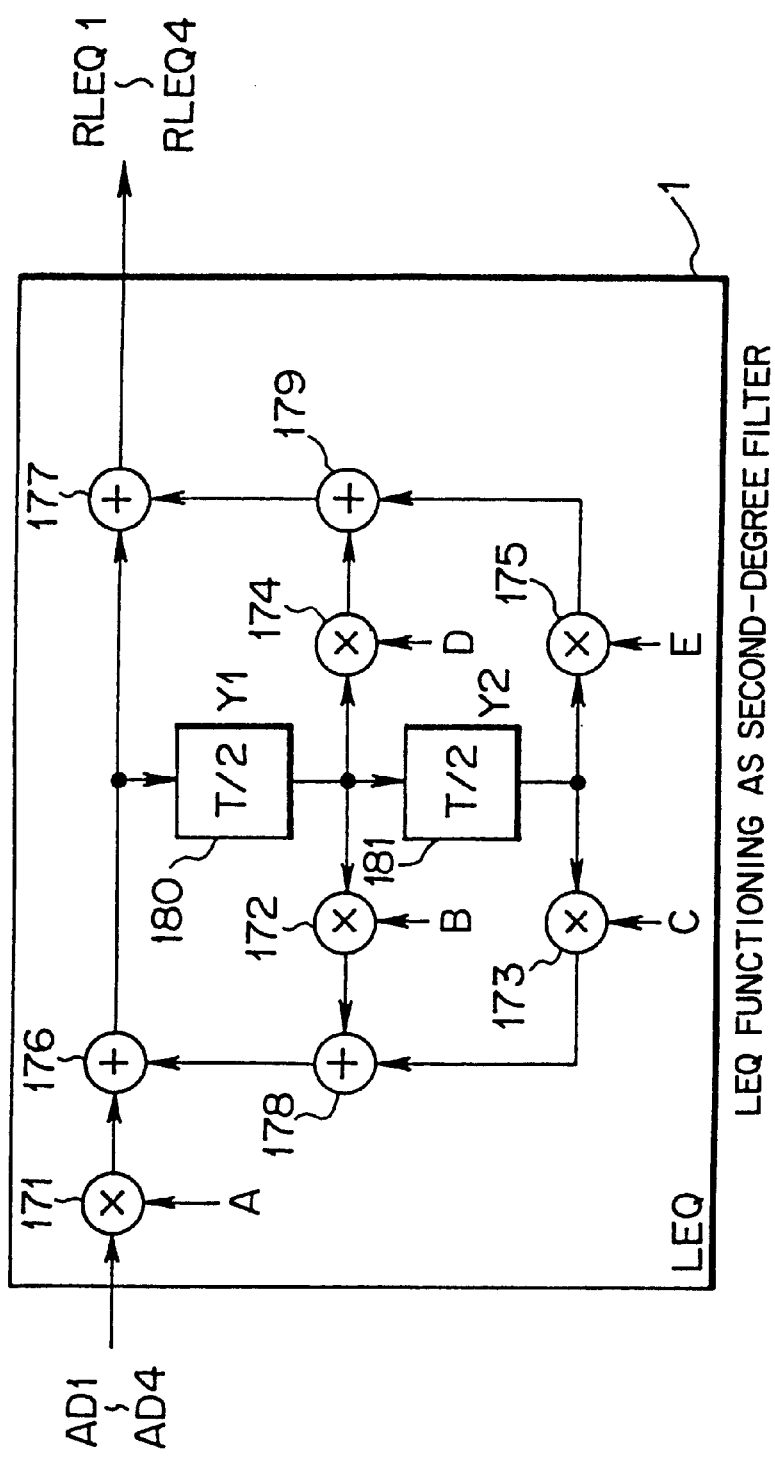
FIG. 7 is a diagram showing an equivalent circuit of a line equalizer in a data communications system according to the present embodiment.

As shown in detail in FIG. 7, the line equalizer 1 is formed of a second-degree recursive filter. The line equalizer 1, shown in FIG. 7, includes multipliers 171 to 175, adders 176 to 179 and taps (Y1, Y2) 180 and 181.

The multiplier 171 multiplies a coefficient A set by the line equalizer control unit 16 (to be described later) by an input signal. The multiplier 172 multiplies a coefficient B set by the line equalizer control unit 16 by an input signal. The multiplier 173 multiplies a coefficient C set by the line equalizer control unit 16 by an input signal. The multiplier 174 multiplies a coefficient D set by the line equalizer control unit 16 by an input signal. The multiplier 175 multiplies a coefficient E set by the line equalizer control unit 16 by an input signal. The characteristic of the line equalizer 1 is decided by setting those coefficients. The tap 180 is a tap (Y1) storing a signal of one period of timing before while the tap 181 is a tap (Y2) storing a signal of one period of timing before.

In such an arrangement, the line equalizer 1 subjects signals (AD1 to AD4; a digital signal obtained by converting an analog signal from the metallic trunk 44) from the A/D converter connected to the front stage thereof to a line equalizing process to provide desired characteristic to the input signals, and then outputs the resultant signals (RLEQ1 to RLEQ4).

The multiplier 171 multiplies the coefficient A by an input signal. The level of a signal input to the multiplier 171 depends on the value of the coefficient A. That is, the multiplier 171 has nearly the same function as an AGC circuit. The coefficients B to E are supplied to the multipliers 172 to 175, respectively. The coefficients B to E decide and change the frequency characteristic of the line equalizer "1".

In concrete, the first-degree filter shown in FIG. 8(*a*) can be configured by setting the coefficients C and E to "0". The zero-degree filter shown in FIG. 8(*b*) can be configured by setting the coefficients B to E to "0".

In FIG. 3, the demodulator 2 demodulates a receive signal from the line equalizer 1. The roll-off filter (ROF) 3 shapes the waveform of the demodulated receive signal. The output signal from the roll-off filter 3 is supplied to the line equalizer control unit 16 and the receive signal processing unit 15 which processes receive data.

The receive signal processing unit 15 performs a signal process to identify a receive signal from the roll-off filter 3 by means of the rear stage terminal. The receive signal processing unit 15 consists of a Nyquist signal canceller (NQCL) 11 which cancels a Nyquist frequency signal, an automatic equalizer (EQL) 12 which equalizes the output of the NQCL 11, a carrier phase control unit (CAPC) 13, and a judging unit 14 which judges a signal point based on the receive signal. The receive signal processing unit 15 has substantially the same configuration as a general modem. Hence, the detailed explanation will be omitted here.

The line equalizer control unit 16 receives the receive signal from the roll-off filter 3 and then extracts tone signals 32 and 33 superimposed on the transmission data 31 from the transmission modem 41. Then the line equalizer control unit 16 judges the characteristic of the trunk which is transmitting data based on the level of each of the extracted tone signals 32 and 33 and then automatically adjusts the line equalizer 1 by setting the coefficients A to E.

In other words, the line equalizer control unit 16 controls automatically the line equalizer 1 according to the result of the comparison between the levels of the extracted tone signals 32 and 33 to flatten the frequency characteristic of the receive signal. The line equalizer control unit 16 also sets the coefficients A to E of the line equalizer 1 to adjust the level of the receive signal to a predetermined value.

That is, the characteristic of the transmission data transmitted via the trunk varies. In the metallic trunk 44, for example, shown in (b) of FIG. 6, as the frequency increases, the attenuation amount of a signal increases, whereby the frequency characteristic of a transmission signal becomes curved. A long transmission distance provides a greater signal attenuation, thus resulting in a reduced signal level as a whole.

The line equalizer control unit 16 can judge the attenuation of the receive signal based on the levels of the Nyquist frequency signals 32 and 33 and sets the coefficients A to E so that the line equalizer 1 has desired characteristic based on the judgment result.

In concrete, the level of a signal in the intermediate band 34 of transmission data is calculated as amplitude value characteristic information by averaging levels of the Nyquist frequency signals 32 and 33 of a receive signal. It can be judged whether or not how large a receive signal is attenuated as a whole by comparing the level of the intermediate band with a reference signal level.

The slope of a straight line 35 connecting two Nyquist frequency signals is calculated by differentiating the Nyquist frequency signals 32 and 33. The slope of the straight line 35 indicates the tendency of the frequency characteristic of a receive signal, so that it can be judged whether the level of a high group is attenuated or the level of a low group is attenuated. That is, it can be decided how the frequency characteristic of the receive signal are deteriorated from positive/negative and large/small of the differential between the Nyquist frequency signals.

In the transmission section 20 in the modem 41, the Nyquist frequency signals 32 and 33 superimposed on the transmission data 31 are continuously transmitted while the modem 41 is being connected to the modems 42 and 43 via the metallic trunk 44.

That is, by confirming the levels of the Nyquist frequency signals 32 and 33 to be superimposed upon data transmission, the line equalizer control unit 16 can assume the characteristic of the trunk on which data are being transmitted and can control the line equalizer 1. In the transmission modem 41, even if data is transmitted without training the receiving (modems 42 and 43, the line equalizer 1 can be automatically adjusted.

In other words, in the data communications system embodying the modems 41 to 43 according to the present embodiment, since training is not needed prior to the starting of data transmission, the data transmission can be quickly started.

Figure 9:
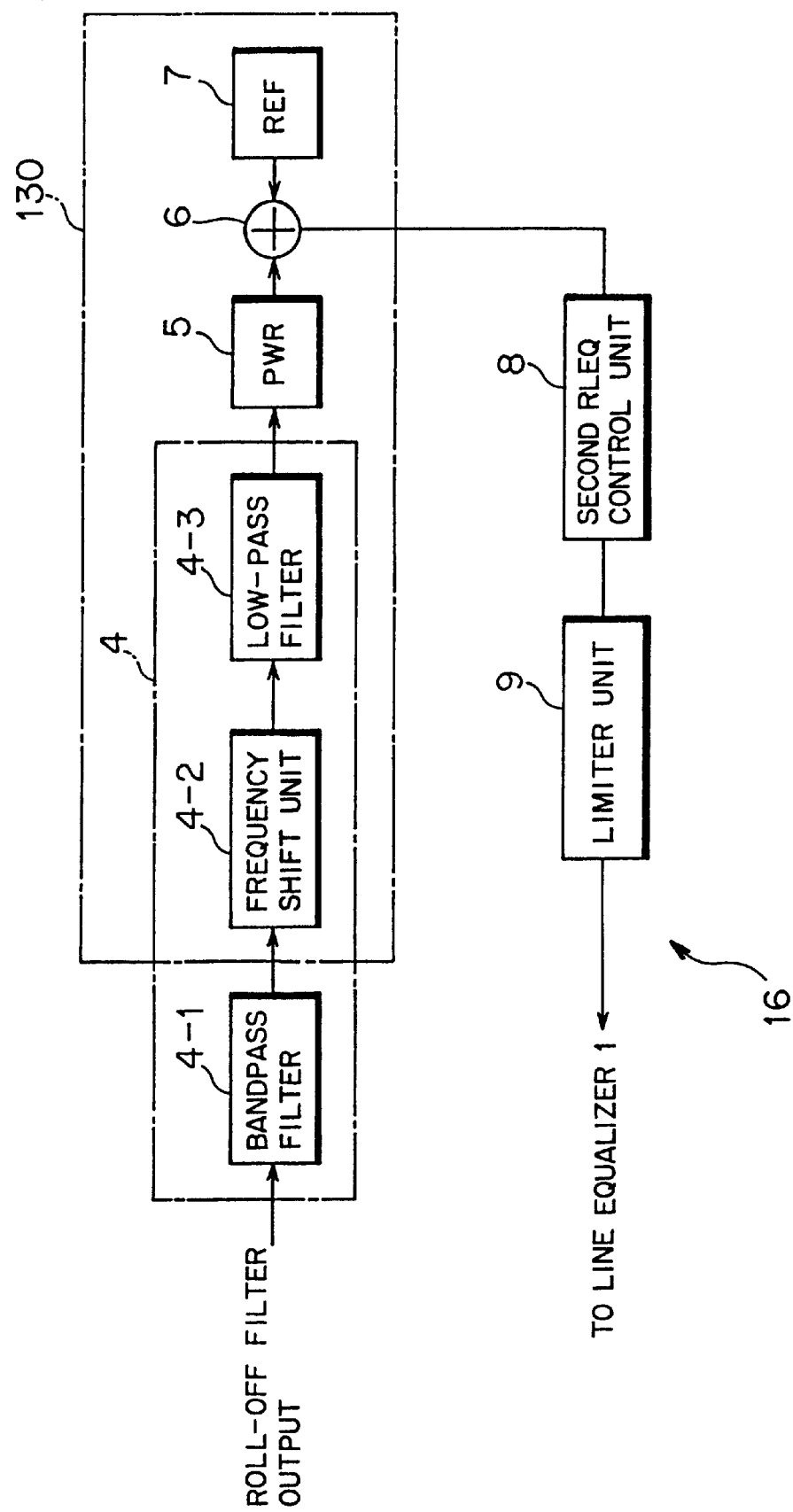
FIG. 9 is a block diagram showing a line equalizer control unit according to the present embodiment.

The line equalizer control unit 16 shown in FIG. 3 is formed of a bandpass filter unit 4, a power arithmetic unit 5, an adder 6, a reference value holding unit 7, an integrating circuit 8, and a limiter 9 as shown in detail in FIG. 9.

The bandpass filter unit 4 extracts the Nyquist frequency components 32 and 33 as specific frequency components in a receive signal. The bandpass filter unit 4 functions as a combination of a high-group bandpass filter (BPFH) which extracts a high-group frequency and a low-group bandpass filter (BPFL) which extracts a low-group frequency. As described in detail later, the bandpass filter unit 4 consists of a bandpass filter 4-1, a frequency shift unit 4-2 and a low-pass filter 4-3.

The bandpass filter unit 4 can preset frequencies of each of the Nyquist frequency signals 32 and 33 as a frequency to be extracted.

The power arithmetic unit 5 calculates the power, or amplitude, of a signal component passing the bandpass filter unit 4. In other words, the power arithmetic unit 5 functions as a level calculating unit which calculates a level (a sum level or a difference level to be described later) of the specific frequency signal extracted by the bandpass filter unit 4.

The adder 6 calculates an amplitude error and frequency error (the frequency characteristic of an amplitude value) by obtaining the differential between a reference value REF from the reference value holding unit 7 and power information (level information of the specific frequency signal) of a receive signal from the power arithmetic unit 5. In other words, the adder 6 functions as a comparing unit which compares the power information of a signal level calculated by the power arithmetic unit 5 with a reference value preset by the reference value holding unit 7.

A reference amplitude value is set as the reference value REF held in the reference value holding unit 7. The reference value REF functions as a reference value which compares the levels of the Nyquist frequency components 32 and 33 upon transmission with the attenuation degree of the Nyquist frequency components 32 and 33 upon receiving.

The integrating circuit 8 integrates an error component (amplitude error information and frequency error information) from the adder 6. The limiter 9 outputs coefficients B to E as parameters to control the line equalizer 1 based on the frequency error information from the integrating circuit 8. The coefficients B to E are decided according to the magnitude of a receive signal from the integrating circuit 8.

Hence, the combination of the adder 6, the reference value holding unit 7, the integrating circuit 8 and the limiter 9 functions as a coefficient calculating unit that calculates a coefficient deciding the characteristic of the line equalizer 1, based on the value of the signal level calculated by the level calculating unit 5.

Figure 10:
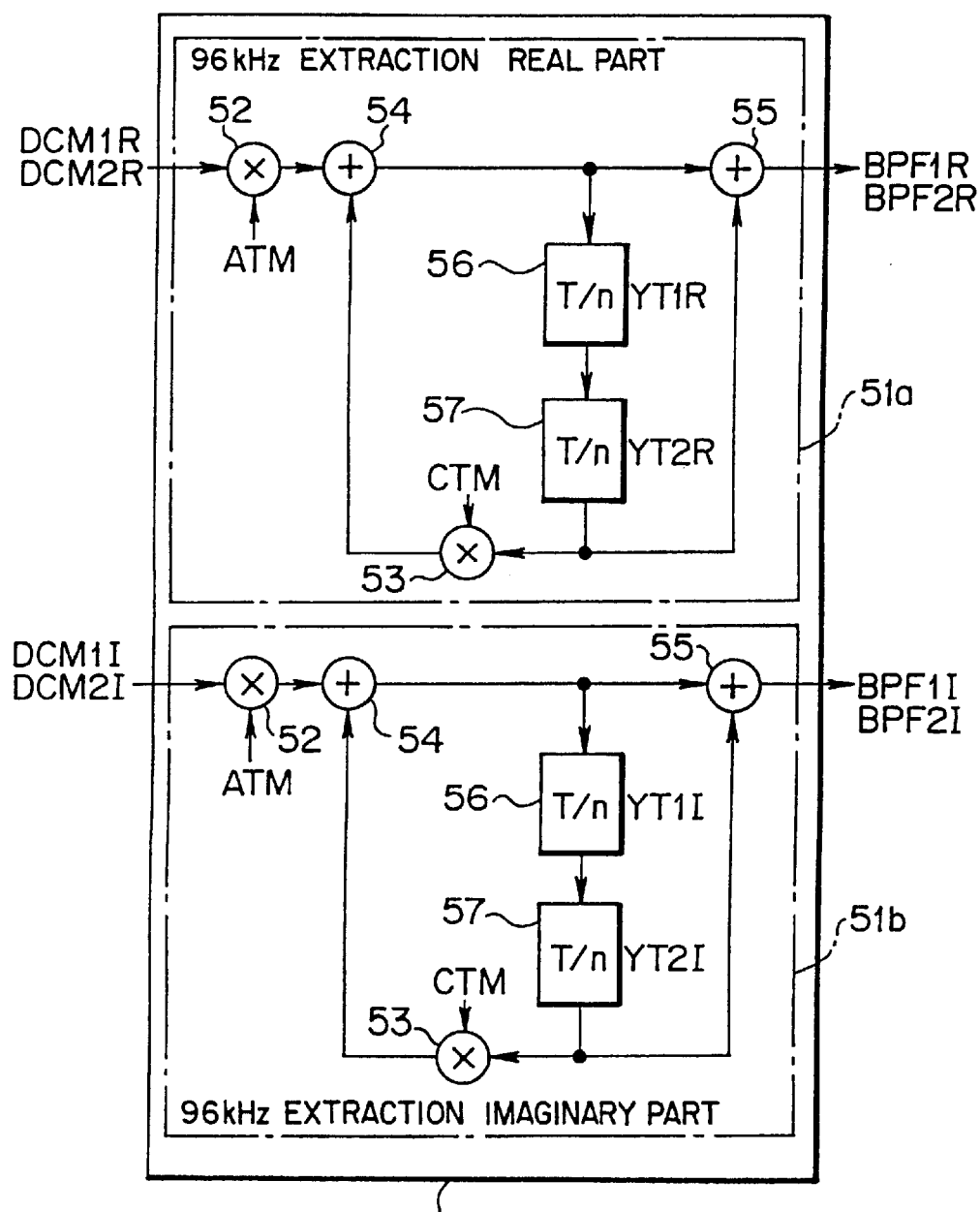
FIG. 10 is a diagram showing an equivalent circuit of the major portion of the line equalizer control unit according to the present embodiment.

The configuration of the bandpass filter 4-1 can be represented as the equivalent circuit shown in detail in FIG. 10. That is, the bandpass filter 4-1, which is connected to the rear stage of the roll-off filter 3, extracts plural Nyquist frequency signals from a receive signal. This arrangement can remove the frequency component containing unnecessary transmission data to control automatically the line equalizer 1.

As shown in FIG. 10, the bandpass filter 4-1 receives four signals DCM1R, DCM2R, DCM1I, and DCM2I and then outputs four signals BPF1R, BPF2R, BPF1I, and BPF2I in which the frequency component containing the transmission data is removed.

Each of the four input signals is a signal demodulated by the demodulating unit 2, that is, a baseband signal. In the sign attached to each of the input signals and output signals, "R" represents a real component while "I" represents an imaginary component.

The bandpass filter 4-1 is formed of a section 51a which extracts a 96 kHz band signal from a real component, and a section 51b which extracts a 96 kHz band signal from an imaginary component. Both the sections 51a and 51b have basically the same configuration.

Numeral 56 represents a tap (YT1) which stores a signal before one period of timing. Numeral 57 represents a tap (YT2) which stores a signal before one period of timing. Numeral 52 represents a multiplier which multiplies an input signal by a filter coefficient ATM. Numeral 53 represents a multiplier which multiplies an input signal by a filter coefficient CTM. Numeral 54 represents an adder. Numeral 55 represents an adder.

The frequency shift unit 4-2 receives BPFLR, BPF2R, BPF1I and BPF2I output from the bandpass filter 4-1 and then shifts them by a predetermined frequency (e.g. ±96 kHz).

Figure 11:
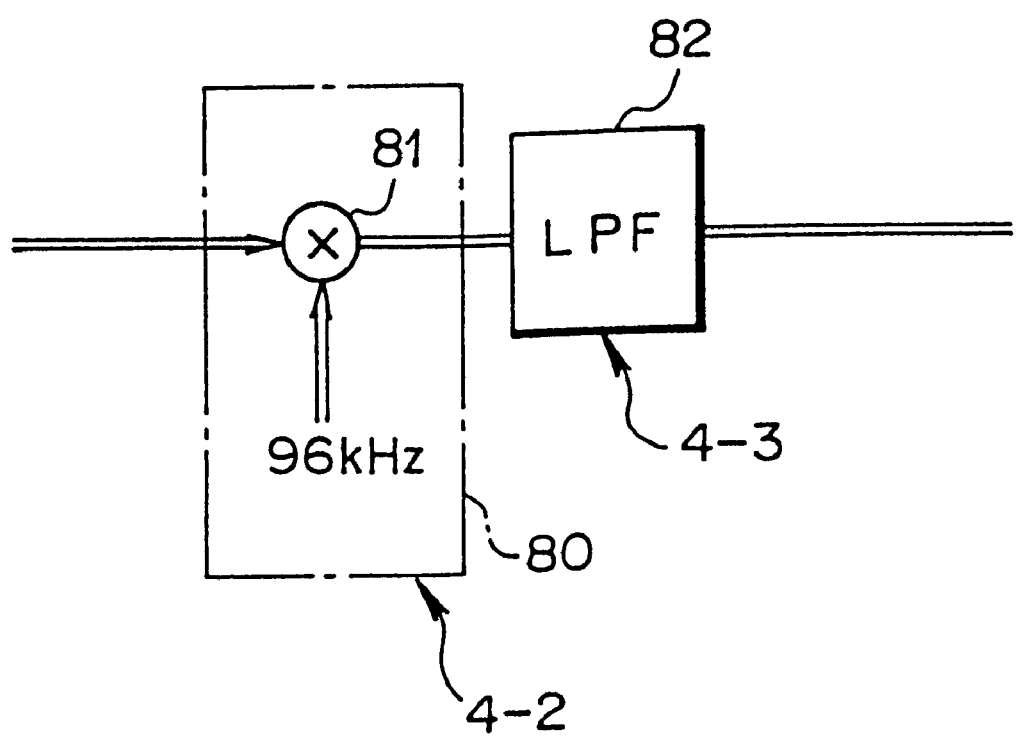
FIG. 11 is a diagram showing the equivalent circuit of the major portion of the line equalizer control unit according to the present embodiment.

By paying attention to the function of the +96 kHz shifting process, the frequency shift unit 4-2 can be expressed by, for example, an equivalent circuit 80 shown in FIG. 11. Moreover, the low-pass filter 4-3 connected to the rear stage of the equivalent circuit 80 can be formed using an equivalent circuit 82 shown in detail in FIG. 12.

That is, the equivalent circuit 80 acting as the frequency shift unit includes a multiplier 81. The multiplier 81 subjects a Nyquest frequency signal to the +96 kHz frequency shift process by rotating a signal input from the bandpass filter 4-1 with +96 kHz. In the frequency shift process, the low-pass filter (LPF) 4-3 at the rear stage can extract the Nyquist frequency signal.

Figure 13:
FIG. 13 is a diagram for explaining an operation of the major portion of the line equalizer control unit according to the present embodiment.

In concrete, of signals input from the bandpass filter 4-1 to the frequency shift unit 4-2, the Nyquist frequency components 32 and 33 are passed. The transmission data is converted into a baseband signal having the frequency spectrum shown in FIG. 13 after removing the frequency component of transmission data. That is, as shown in FIG. 13, the Nyquist frequency signal 32' from the bandpass filter 4-1 has a frequency component of −96 kHz including a real component while the Nyquist frequency signal 33' from the bandpass filter 4-1 has a frequency component of +96 kHz including an imaginary component. The frequency component mixedly includes a real component and an imaginary component.

Figure 14A:
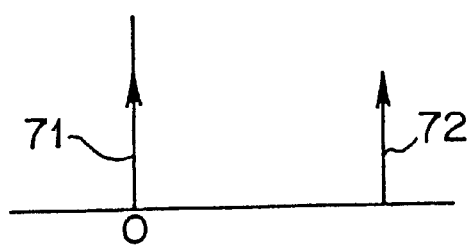
FIGS. 14(a) and 14(b) are diagrams each for explaining an operation of the major portion of the line equalizer control unit according to the present embodiment.
Figure 14B:
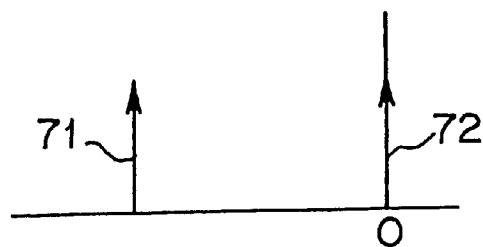

In the frequency shift unit 4-2, the Nyquist frequency component is separated into a +96 kHz component and a −96 kHz component by shifting the Nyquist frequency component at the position of +96 kHz by 96 kHz as shown in FIG. 14(a) and by shifting the Nyquist frequency component at the position of −96 kHz by 96 kHz as shown in FIG. 14(b). This process enables the low-pass filer 4-3 at the rear stage to extract easily the Nyquist frequency component.

In concrete, as shown in FIG. 14(a), the Nyquist frequency component is separated into a component 71 of a frequency of 0 kHz and a component 72 of a frequency of 192 kHz by shifting the signals 32' and 33' (shown in FIG. 13) by +96 kHz. As shown in FIG. 14(b), the Nyquist frequency component is separated into a component 71 of a frequency of −192 kHz and a component 72 of a frequency of 0 kHz by shifting the signals 32' and 33' (shown in FIG. 13) by −96 kHz.

When receiving a signal shifted by +96 kHz, for example, as shown in FIG. 14(a), the low-pass filter 4-3 at the rear stage can remove the second signal 72 corresponding to the Nyquist frequency component in a high group by passing only the first signal 71 corresponding to the Nyquist frequency component in a low group.

Similarly, when the −96 kHz shifted signal is input, for example, as shown in FIG. 14(b), only the second signal 72 corresponding to the high group Nyquist frequency signal is passed. Thus the first signal 71 corresponding to the low group Nyquist frequency signal can be removed.

In other words, after the frequency shift circuit 4-2 shifts a signal from the bandpass filter 4-1, at least one of the Nyquist frequency signals of ±96 kHz can be extracted via the low-pass filter 4-3. Hence, it is not needed to perform the ±96 kHz component separating process after the signals are passed through the bandpass filter 4-1.

Figure 15:
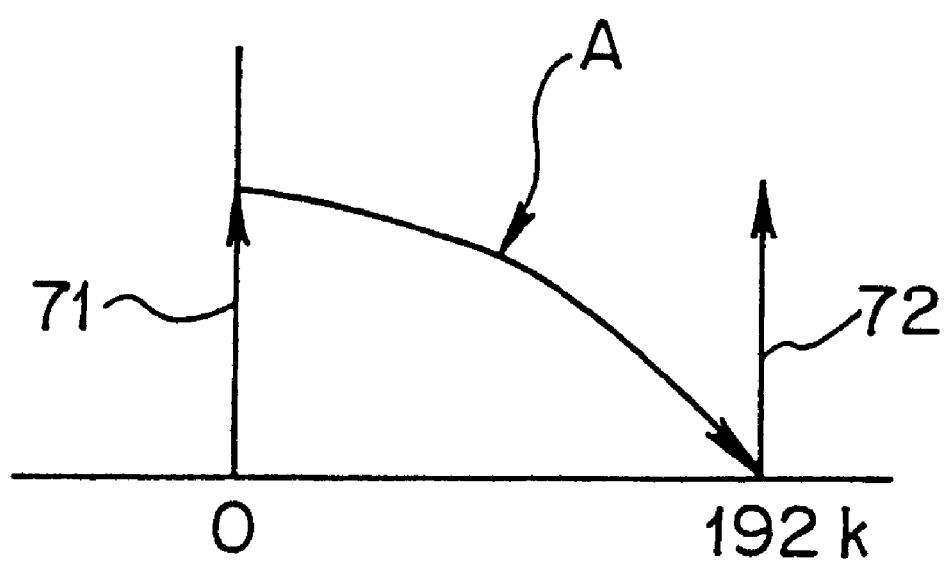
FIG. 15 is a diagram for explaining an operation of the major portion of the line equalizer control unit according to the present embodiment.

For example, when the frequency shift circuit 4-2 performs the +96 kHz frequency shifting operation, a filter having the passage characteristic A shown in FIG. 15 is used as the low-pass filter 4-3 at the rear stage. This filter can pass only the first signal (dc component) corresponding to the high group Nyquist frequency signal but remove the second signal 72 corresponding to the low group Nyquist frequency signal.

Figure 12:
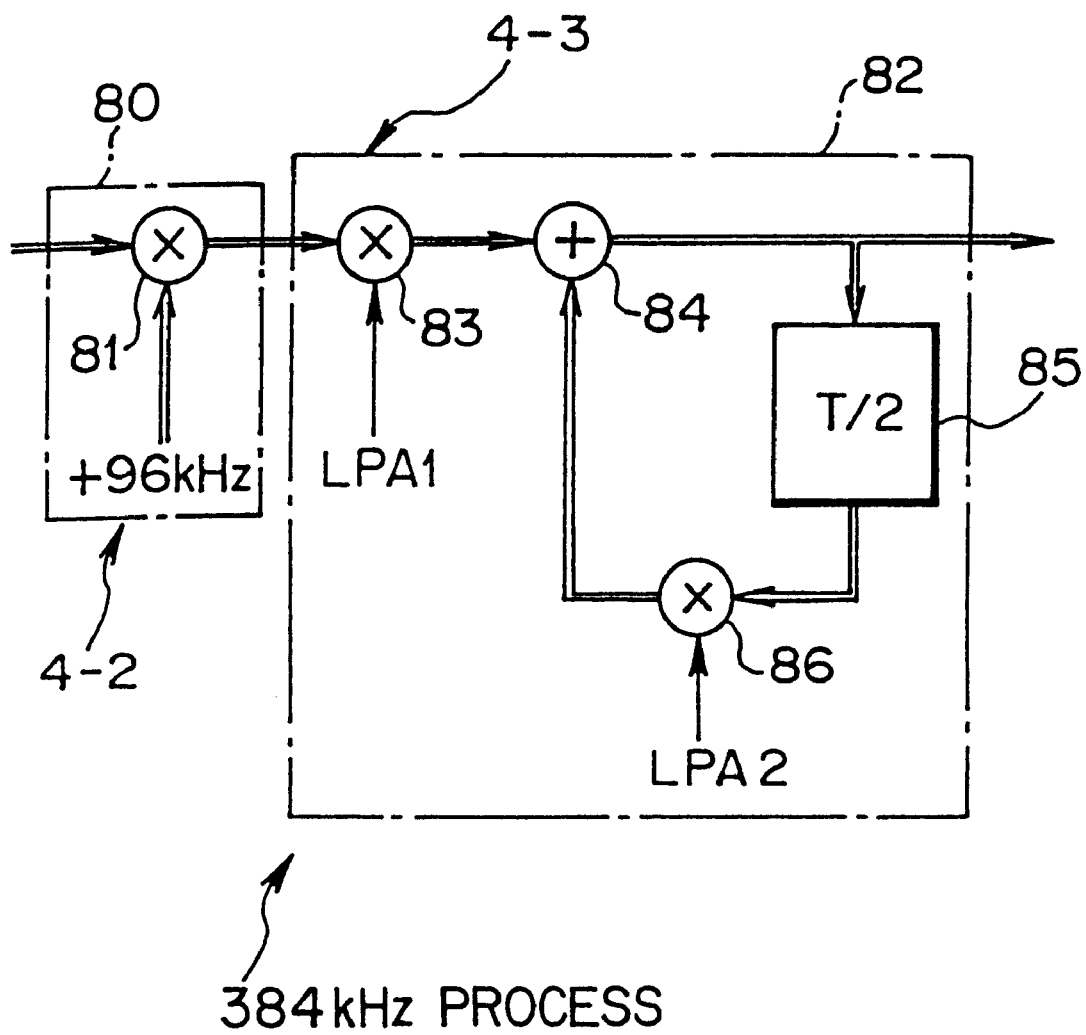
FIG. 12 is a diagram showing the equivalent circuit of the major portion of the line equalizer control unit according to the present embodiment.

As shown in FIG. 12, the equivalent circuit 82 acting as the low pass filter 4-3 consists of multipliers 83 and 86, an adder 84 and a tap 85. In FIG. 12, double lines represent vector signals.

The multiplier 83 multiplies an input signal by the coefficient value LPA1. The adder 84 adds the input signal from the multiplier 83 to the input signal from the multiplier 86. The tap 85 stores a signal of one period of timing before output from the adder 84. The multiplier 86 multiplies the output signal from the tap 85 by the coefficient LPA2 and then outputs the result to the adder 84.

The frequency shift unit 4-2 includes a function unit of performing a +96 kHz shift process (refer to numeral 80 in FIG. 12) and a function unit of performing a −96 kHz shift process. The low-pass filter includes equivalent circuits arranged in parallel each of which subjects an output signal from each function unit acting as a frequency shift unit to a low-pass filtering process.

Figure 16:
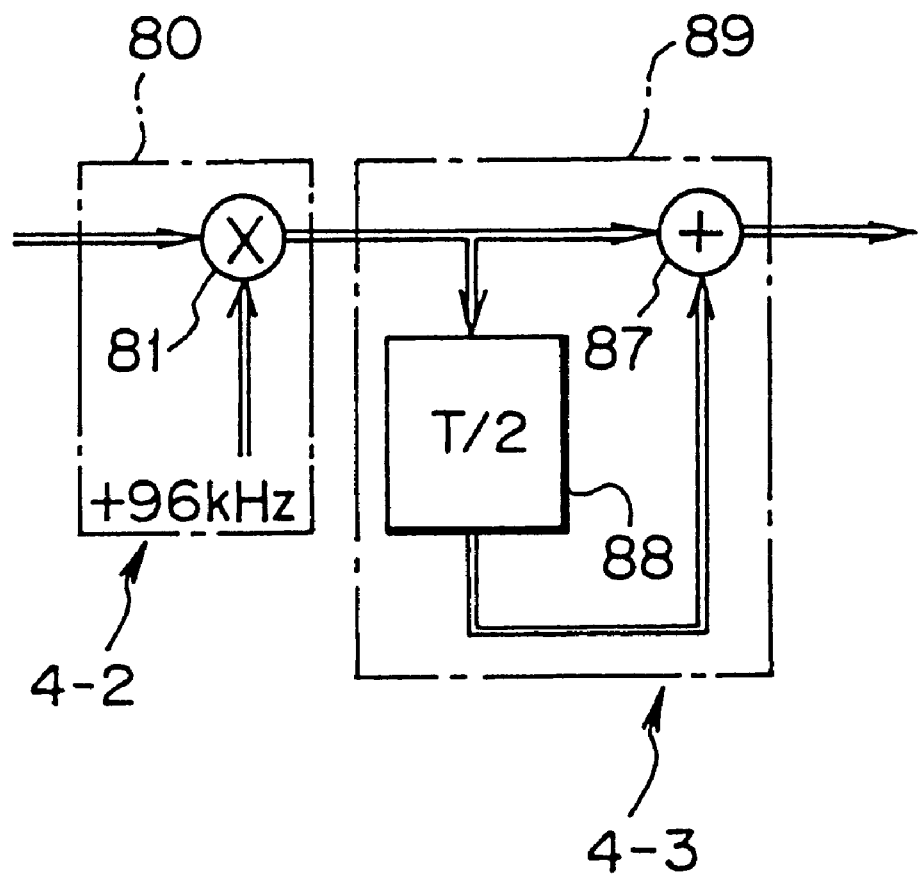
FIG. 16 is a diagram showing the equivalent circuit of the major portion of the line equalizer control unit according to the present embodiment.

When attention is paid to the +96 kHz shift process of the frequency shift unit 4-2, an equivalent circuit 89 shown in FIG. 16 can be used as the low-pass filter 4-3.

The equivalent circuit 89 shown in FIG. 16 is formed of only an adder 87 and a tap 88. Compared with the equivalent circuit 82 shown in FIG. 12, the equivalent circuit 89 can reduce the number of processes because multiplication of various coefficients is not needed. Specifically, some leeway can be provided to a process cycle of the DSP by simplifying the configuration of the equivalent circuit to deal with the high transmission rate of the modem according to the present embodiment.

The bandpass filter 4-1 which passes only the 96 kHz band signal is connected to the front stage of the frequency shift unit 4-2 (as already described). In this arrangement, almost all the other band components are removed at the point of time of input to the shift circuit 4-2. The configuration of the low-pass filter 4-3 at the rear stage of the frequency shift unit 4-2 can be simplified by the removed component.

The equivalent circuit 89 shown in FIG. 16 can function as the low-pass filter 4-3 by adding a signal of one period of timing before stored in the tap 88 to the currently input signal. Like the equivalent circuit 82 shown in FIG. 12, it is not needed to multiply the various coefficients to realize the low-pass filter 4-3.

In comparison with the function shown in FIGS. 12 and 16, the combined function of the frequency shift circuit 4-2 and the low-pass filter 4-3 is further simplified by utilizing that the frequency shift amount (±96 kHz) of the shift circuit according to the present embodiment is half of the Nyquist frequency (192 kHz). For example, the combined function can be formed as an equivalent circuit 90 shown in FIG.

17(a) and an equivalent circuit 95 shown in FIG. 17(b), to be described later.

Assuming that an input signal is X+jY, the frequency shift can be expressed as follows:

$$(X+jY)(\cos x + j \sin x) = (X \cos x + Y \sin x) + j(Y \cos x + X \sin x) \quad (1)$$

By factorizing sine wave having a frequency of 96 kHz corresponding to a frequency shift amount into every π/2 phases and a cosine wave having a frequency of 96 kHz corresponding to a frequency shift amount into every π/2 phases, the sine wave and cosine wave each shifted by ±96 kHz are expressed with 0 or ±1, as shown in FIG. 18(a). FIG. 18(b) shows a waveform shifted by +96 kHz while FIG. 18(c) shows a waveform sifted by −96 kHz.

In the case of the +96 kHz shift operation, each phase is expressed as follows according to the formula (1).

Phase 0: X+jY

Phase 1: Y+jX

Phase 2: −X−jY

Phase 3: −Y−jX

When receiving the signal, the equivalent circuit 90 shown in FIG. 17 outputs the following values.

Phase 0+Phase 1: (X+Y)+j(Y+X)

Phase 1+Phase 2: (Y−X)+j(X−Y)

Phase 2+Phase 3: (−X−Y)+j(−Y−X)

Phase 3+Phase 0: (−Y+X)+j(−X+Y)

As to (phase 0+phase 1) and (phase 2+phase 3), the phase difference is 180°. Similarly, as to (phase 1+phase 2) and (phase 3+phase 0), the phase difference is 180°. As to (phase 0+phase 1) and (phase 1+phase 2), the phase difference is 90°. As to (phase 1+phase 2) and (phase 2+phase 3), the phase difference is 90°.

When a −96 kHz shifting operation is performed, each phase is expressed as follows according to the formula (1).

Phase 0: X+jY

Phase 1: Y−jX

Phase 2: −X−jY

Phase 3: −Y+jX

As a result, the following expressions are given by inputting the signal in each phase to the simplified LPF shown in FIG. 16.

Phase 0+Phase 1: (X+Y)+j(Y−X)

Phase 1+Phase 2: (Y−X)+j(−X−Y)

Phase 2+Phase 3: (−X−Y)+j(−Y+X)

Phase 3+Phase 0: (−Y+X)+j(X+Y)

The relationships between phases are similar to those in the +96 kHz shifting operation.

Figure 17A:
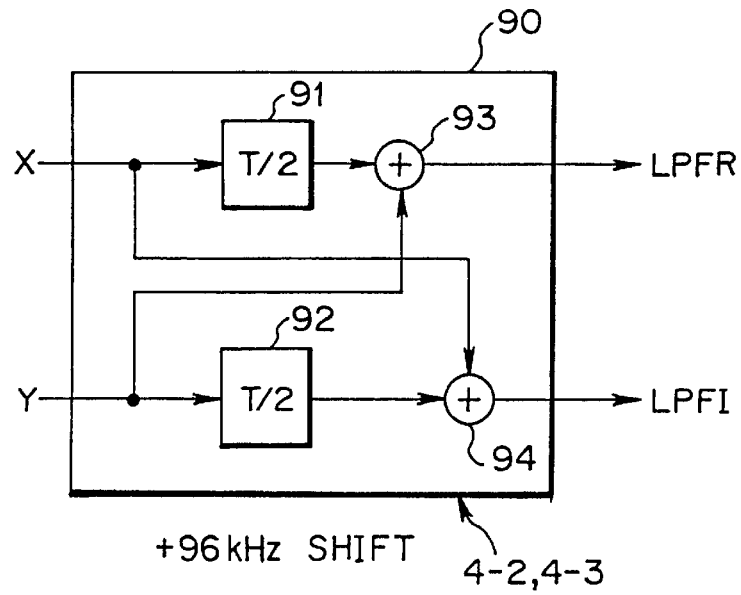
FIGS. 17(a) and 17(b) are diagrams each showing the equivalent circuit of the major portion of the line equalizer control unit according to the present embodiment.
Figure 17B:
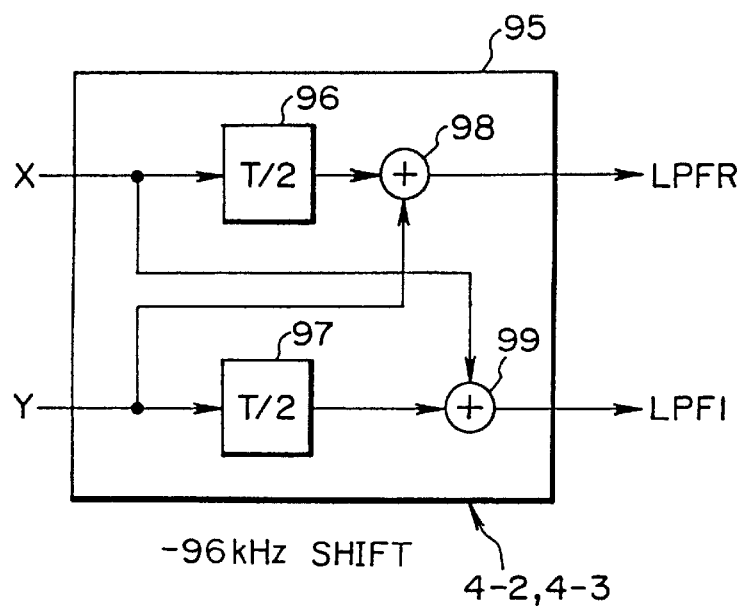

When attention is paid to only the relationship between the phase 0 and the phase 1, the equivalent circuit which shifts by +96 kHz can be expressed as shown in FIG. 17(a) while the equivalent circuit which shifts by −96 kHz can be expressed as shown in FIG. 17(b).

Since the frequency shift unit 4-2 and the low-pass filter 4-3 according to the present embodiment process at 12 kHz lower than the Nyquist frequency of 192 kHz, the frequency shifting process can be sufficiently handled by paying attention to only the relationship between the phase 0 and the phase 1. The detail expression will be made later.

That is, the equivalent circuit 90 shown in FIG. 17(a) has a function as the frequency shift unit 4-2 which performs the +96 kHz shift process and a function as the low-pass filter 4-3. The equivalent circuit 90 includes taps 91 and 92 and adders 93 and 94.

On the other hand, the equivalent circuit 95 shown in FIG. 17(b) has a function as the frequency shift unit 4-2 which performs the −96 kHz shift process and a function as the low-pass filter 4-3. The equivalent circuit 95 includes taps 96 and 97 and adders 98 and 99.

In the equivalent circuit shown in FIG. 17(b), a real component X input from the input terminal is supplied to the tap 91 and the adder 93 while an imaginary component Y input from the input terminal is supplied to the tap 92 and the adder 94.

The adder 93 obtains the difference between the input real component X input one period of timing before from the tap 91 and an imaginary component Y currently input. The adder 94 obtains the difference between an imaginary component Y input one period of timing before from the tap 92 and a real component X currently input.

The adder 93 outputs (X−Y), or the real component of (phase 0+phase 1), as an LPFR. The adder 94 outputs (Y+X), or the imaginary component of (phase 0+phase 1), as an LPFI.

In the equivalent circuit shown in FIG. 17(b), the real component X input from the input terminal is supplied to the tap 96 and the adder 98 while the imaginary component Y input from the input terminal is supplied to the tap 97 and the adder 99.

The adder 98 adds the real component X input one period of timing before from the tap 96 to the imaginary component currently input to obtain (X+Y). The adder 99 obtains the difference (Y−X) between the imaginary component Y input one period of timing before stored in the tap 97 and the real component X currently input. In this operation, the adder 98 issues its output as an LPFR while the adder 99 issues its output as an LPFI.

Figure 19:
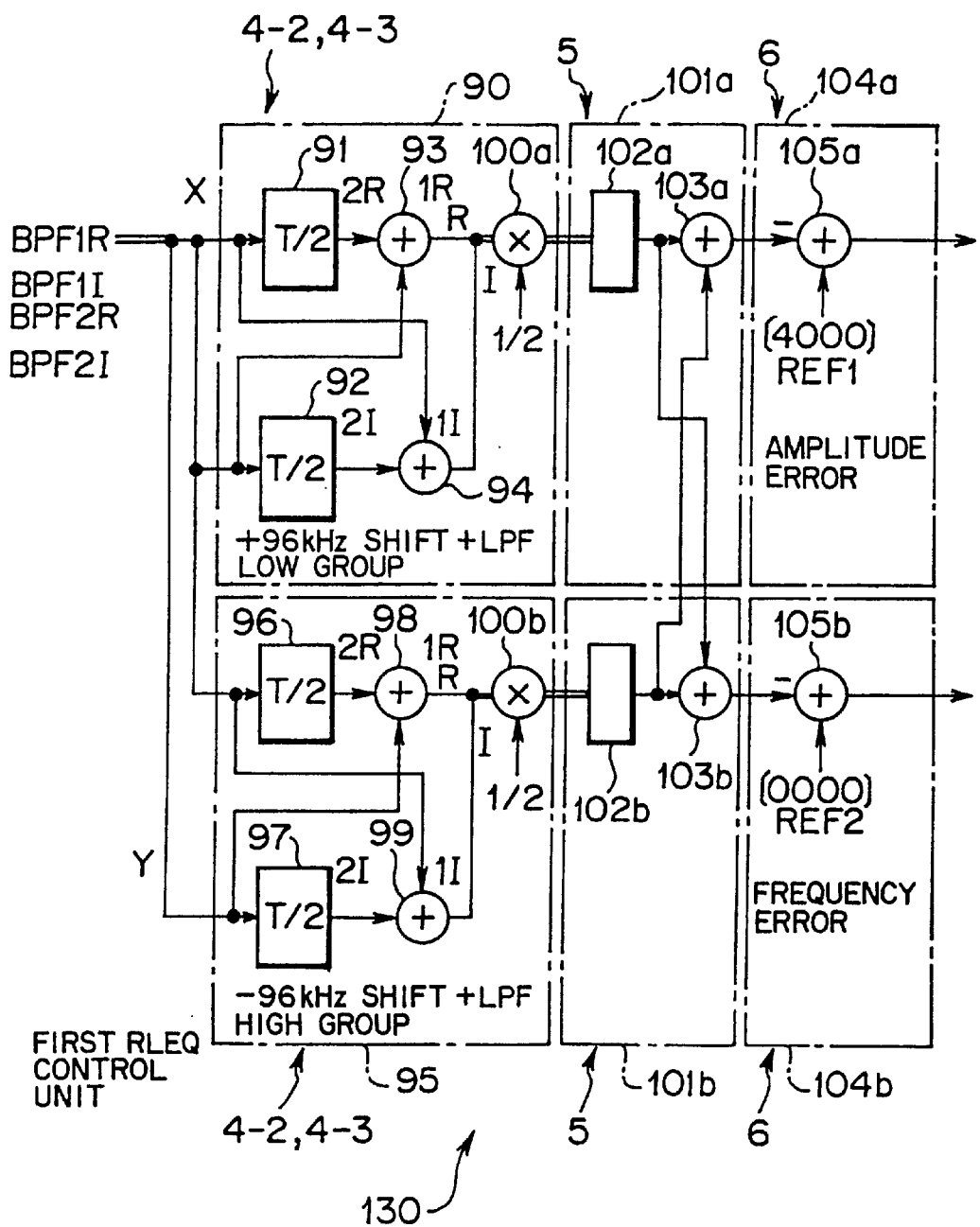
FIG. 19 is a diagram showing the equivalent circuit of the major portion of the line equalizer control unit according to the present embodiment.

The equivalent circuit 90 is arranged at the front stage of the power arithmetic unit 5 as shown in FIG. 19 and functions as a frequency shift and low-pass filter sharing unit. The equivalent circuit 95 is arranged at the front stage of the power arithmetic unit 5 as shown in FIG. 19 and functions as a frequency shift and low-pass filter sharing unit.

The first RLEQ control unit 130 consists of the frequency shift unit 4-2, the low-pass filter 4-3, the power arithmetic unit 5 and the adder 6, shown in FIG. 19. The RLEQ control unit 130 also can be formed of, for example, a DSP.

The equivalent circuit 90 shown in FIG. 19 receives signals (BPF1R, BPF2R, BPF1I, BPF2I) from the bandpass filter 4-1 shown in FIG. 10 and then extracts a Nyquist frequency signal 71 (refer to FIG. 14(a)) in low group, that is, in the −96 kHz band, from the Nyquist frequency signals 32' and 33' (refer to FIG. 13) in a baseband.

In the same manner, the equivalent circuit 95 extracts a Nyquist frequency signal 72 (refer to FIG. 14(b)) in high group, that is, in the +96 kHz band, from the Nyquist frequency signals 32' and 33' (refer to FIG. 13) sent from the bandpass filter 4-1.

In FIG. 19, the multiplier 100a is a constituent element of the equivalent circuit 90 (not shown in FIG. 17(a)). In order to prevent an overflow from occurring in the rear-stage signal processing operation, the multiplier 100a multiplies a vector signal obtained by converting output signals from the adders 93 and 94 in a vector form by a level adjustment value (e.g. ½).

The multiplier 100b is a constituent element of an equivalent circuit 95 (not shown in FIG. 17(b)). In order to prevent an overflow from occurring in the rear-stage signal processing operation, the multiplier 100b multiplies a vector signal obtained by converting output signals from the adders 98 and 99 in a vector form by a level adjustment value (e.g. ½).

In the equivalent circuit 90 or 95 in the combination of the frequency shift circuit 4-2 and the low-pass filter 4-3, the signs 1R, 1I, 2R, and 2I represent input signals respectively.

The sign R represents a real component of an input signal while the sign I represents an imaginary component of an input signal. The numbers 1 and 2 represent the order of inputting a signal to the equivalent circuits 90 and 95. That is, the signal 1R shows a signal which is input earlier than the signal 2R by one period of timing (or stored in the taps 91 and 96) while the signal 1I shows a signal which is input earlier than the signal 2I by one period of timing (or stored in the taps 92 and 97).

The power arithmetic unit 5 shown in FIGS. 3 or 9 is expressd by the equivalent circuit numbered 110a or 101b, as shown in detail in FIG. 19. The adder 6 is expressed by the equivalent circuit numbered 104a or 104b, as shown in detail in FIG. 19. The paths depicted with double lines in FIG. 19 show the flows of vector signals. The paths depicted with solid lines show the flows of scalar signals. In the figure, symbol X represents a real signal while Y represents an imaginary signal.

The equivalent circuit 101a forming the power arithmetic unit 5 functions as a full-power calculating unit which calculates the level of an intermediate band signal in transmission data by calculating the sum (corresponding to an average value obtained by multiplying ½) of the levels of two Nyquist frequency signals (refer to the tone signal shown with numeral 71 in FIG. 14(a) and the tone signal shown with numeral 72 in FIG. 14(b)) extracted by the bandpass filter unit 4. The full-power calculating circuit 110a includes an adder 103a.

The equivalent circuit numbered 101b functions as a power difference calculating unit which calculates the slope component of a straight line connecting level values of two Nyquist frequency signals extracted by calculating the power differences of two tone signals 71 and 72 acting as plural specific frequency signals. The power difference calculating circuit 101b includes an adder 103b.

The adder 6 shown in FIG. 3 or 9 functions as an error calculating unit which receives the level of the intermediate band signal 34 calculated by the power arithmetic unit 5 and the power difference of the two tone signals and then calculates errors of them with respect to the value of a tone signal superimposed upon transmission. The adder 6 is formed of an amplitude error calculating unit 104a and a frequency error calculating unit 104b.

The amplitude error calculating unit 104a includes an adder 105a which calculates the difference between a first reference value REF1 having a predetermined value from the reference value holding unit 7 and the signal from the full-power calculating unit 110a. The amplitude error calculating unit 104a outputs an arithmetic result by the adder 105a as amplitude value error information. The first reference value REF can be, for example, [4000] in hexadecimal notation, but can be arbitrarily selected.

The frequency error calculating unit 104b includes an adder 105b which calculates the difference between a second reference value REF2 having a predetermined value from the reference value holding unit 7 and the signal from the full-power calculating unit 101b. The amplitude error calculating unit 104a outputs an arithmetic result by the adder 105b as frequency value error information. The second reference value REF2 can be represented as [0000] in hexadecimal notation.

In such an arrangement, the first RLEQ control unit 130 shown in FIG. 19 separates the vector signal input from the bandpass filter 4-1 into two scalar signals having a real component and an imaginary component and then inputs them to the frequency shift unit 4-2 and the low-pass filter 4-3.

The function unit (equivalent circuits 90 and 95) which functions as the combination of the frequency shift unit 4-2 and the low-pass filer 4-3 sends its output signal to the function unit (the full-power calculating unit 110a and the power difference calculating unit 101b) acting as the power arithmetic unit 5.

In the power arithmetic unit 5, the full-power calculating unit 101a receives a low-group Nyquist frequency signal from the equivalent circuit 90 while the full-power reference calculating unit 101b receives a high-group Nyquist frequency signal from the equivalent circuit 95.

The adder 103a in the full-power calculating unit 101a adds the low-group Nyquist frequency signal to the high-group Nyquist frequency signal. Since the multiplying circuit 131g halves the signals, the output of the adder 132d corresponds to the average value of two Nyquist frequency signals, or a level of an intermediate band signal (refer to numeral 34 in (b) of FIG. 6).

The adder 103b in the power difference calculating unit 101b subtracts the low-group Nyquist frequency signal from the high-group Nyquist frequency signal to obtain the difference in amplitude of them. As a result, the frequency characteristic of a receive signal can be obtained by calculating the slope B of the straight line shown in (b) of FIG. 6).

The power arithmetic unit 5 (the full-power calculating unit 101a or the power difference calculating unit 101b) sends its output to the adder 6 acting as an error calculating unit (the amplitude error calculating unit 104a or the frequency error calculating unit 104b).

In the amplitude error calculating unit 104a, the adder 106a compares a signal from the full-power calculating unit 132a with the first reference value REF1 having a predetermined value and then calculates the attenuation amount of the receive signal, thus outputting the result as amplitude error information.

In the frequency error calculating unit 104b, the adder 105b compares a signal from the power difference calculating unit 101b with a second reference value REF2 having a predetermined value, thus outputting a value corresponding to the result as frequency error information.

When the frequency characteristic of the receive signal is flat, the two Nyquist frequency signals have the same level. Then the power difference calculating unit 101b provides an output of "0".

It is understood that when the output of the power difference calculating unit 101b is larger than a hexadecimal reference value [0000], or has a positive value, the higher-frequency component of the receive signal is larger than the lower-frequency component. In this case, the frequency error calculating unit 104b outputs a signal having a negative value.

On the other hand, when the output of the power difference calculating unit 101b is smaller than a hexadecimal reference value [0000], or has a negative value, the higher-frequency component of the receive signal is in an attenuated state. In this case, the frequency error calculating unit 104b outputs a signal having a positive value.

Accordingly, the output of the frequency error calculating unit 104b shows the frequency characteristic of the receive signal.

As described above, the first RLEQ control unit 130 can judge the amplitude error and frequency error of the receive signal according to the value of a signal output from the adder 6 acting as an error calculating unit.

Figure 20:
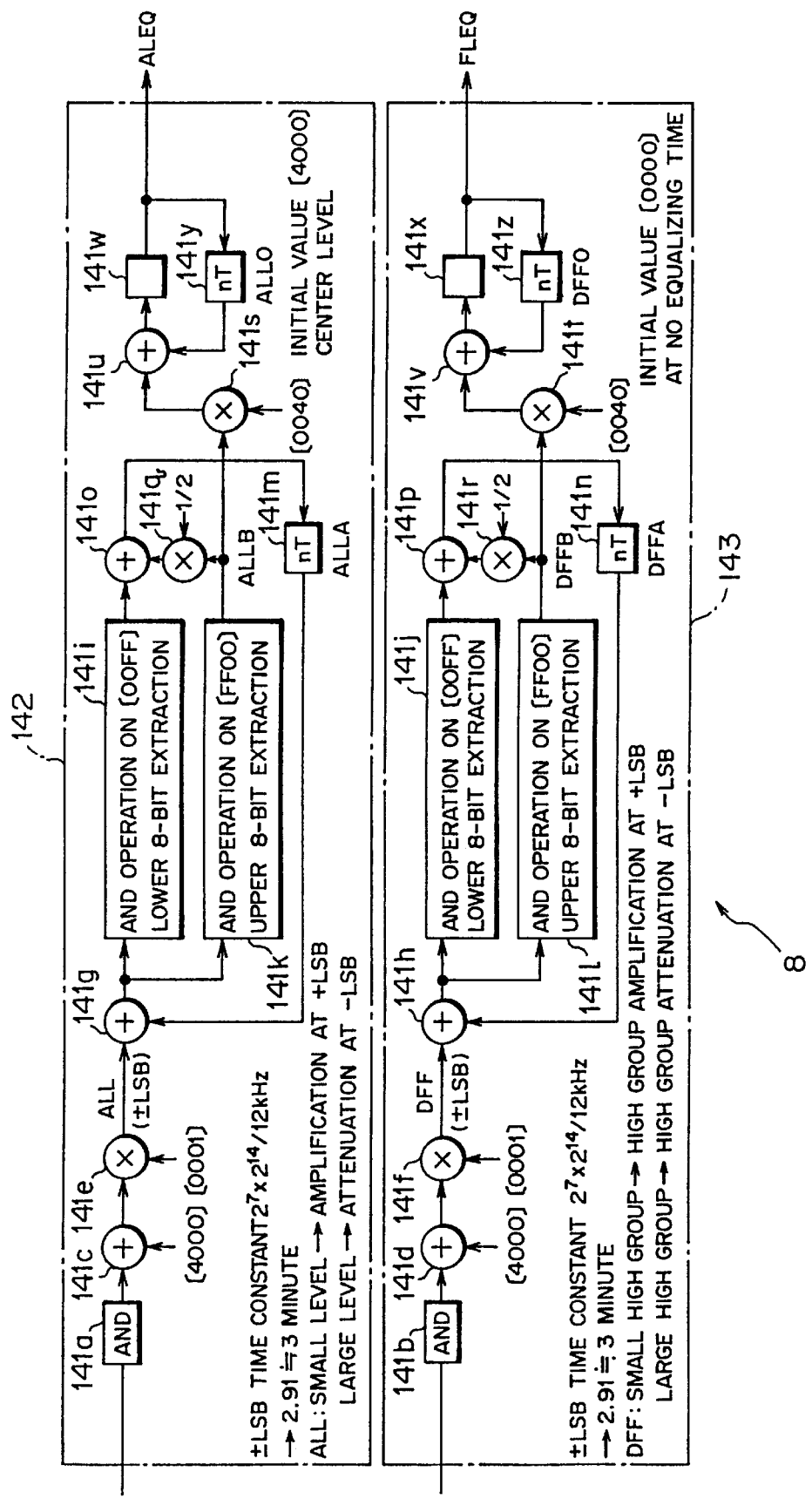
FIG. 20 is a diagram showing the equivalent circuit of the major portion of the line equalizer control unit according to the present embodiment.

The integrating circuit 8 shown in FIG. 3 or 9 integrates the amplitude error information and frequency error information from the adder 6 as the outputs of the first RLEQ control unit 130. The integrating circuit 8 is formed as the second RLEQ control unit shown in FIG. 20. That is, the second RLEQ control unit 8 shown in FIG. 20 has a two-stage configuration including an amplitude error integrating unit 142 and a frequency error integrating unit 143.

In detail, the amplitude error integrating unit 142 consists of an AND circuit 141*a*, an adder 141*c*, a multiplier 141*e*, an adder 141*g*, AND circuits 141*i* and 141*k*, a tap 141*m*, an adder 141*o*, multipliers 141*q* and 141*s*, an adder 141*u*, a square circuit 141*w*, and a tap 141*y*.

Similarly, in detail, the frequency error integrating unit 143 consists of an AND circuit 141*b*, an adder 141*d*, a multiplier 141*f*, an adder 141*h*, AND circuits 141*j* and 141*l*, a tap 141*n*, an adder 141*p*, a multipliers 141*r* and 141*t*, an adder 141*v*, a square circuit 141*x*, and a tap 141*z*.

The amplitude error integrating unit 142 and the frequency error integrating unit 143 basically have the same configuration, but are different from each other in the type of information to be handled by them. The amplitude error integrating unit 142 will be specifically described below. The frequency error integrating unit 143 will be described as to necessary elements.

Now, the signal process covering the AND circuit 141*a*, the adder 141*c* and the multiplier 141*e* in the amplitude error integrating unit 142 will be explained with reference to FIG. 21. Here, signals are represented in hexadecimal notation.

In the present embodiment, a DSP is used as the RLEQ control units 130 and 8. However, it is assumed that the DSP can handle signals ranging from +2.0 to −2.0. For that reason, numeral values represented in decimal notation on the table in FIG. 21 range from +2.0 to −2.0.

The numeral values in hexadecimal notation can cover from [0000] to [FFFF]. The range from +0.0 to +2.0 corresponds to [0000] to [7FFF]. The range from −0.0 to −2.0 corresponds to [FFFF] to [8000].

The AND circuit 141*a* implements the AND operation (a logical product arithmetic) of an input signal and [8000] in hexadecimal notation. Thus, a polarity bit can be extracted from the signal input to the AND circuit 141*a*.

That is, the AND circuit 141*a* implements the AND operation of a numerical value in the range [0000] to [7FFF] and [8000], and then produces the result [0000]. The AND circuit 141*a* implements the AND operation of a numerical value in the range [FFFF] to [8000] and [8000], and then produces the result [8000].

That is, when the sign of an input signal is positive, the AND circuit 141*a* always produces an output of [0000]. The leading bit becomes "0" in binary notation. When the sign of an input signal is negative, the AND circuit 141*a* always produces an output of [8000]. The leading bit becomes "1". That is, the polarity of an input signal can be identified using the output from the AND circuit 141*a*. Here, [0000] corresponds to +0.0 in decimal notation while [8000] corresponds to −2.0.

Sequentially, the adder 141*c* adds [4000] in hexadecimal notation to the output of the AND circuit 141*a*. Since [4000] corresponds to +1.0 in decimal notation, the adder 141*c* outputs [4000] (+1.0 in decimal notation) in response to an input signal [0000]. The adder 141*c* outputs [C000] (−1.0 in decimal notation) in response to an input signal of [8000]. Thus, the adder 141*c* outputs ±1.0 in decimal notation according to the polarity of a signal input to the amplitude error integrating circuit 142.

Moreover, the integrator 141*e* multiplies the output from the adder 141*c* by [0001] in hexadecimal notation. When the output of the adder 141*c* is [4000], the multiplier 141*e* outputs [0001] corresponding to +LSB. When the output of the adder 141*c* is [C000], the multiplier 141*e* outputs [FFFF] corresponding to −LSB.

Hence, the multiplier 141e outputs a signal ALL having a sign corresponding to the amplitude of the input signal. When the level of the input is smaller than the reference value, +LSB is output as the signal ALL. When the level of the input signal is larger than the reference value, −LSB is output as the signal ALL. That is, the circuit chain ranging from the AND circuit 141*a* to the multiplier 141*e* can output ±LSB according to the sign of the input signal.

The multiplier 141*f* in the frequency error integrating unit 143 outputs a signal DFF having a sign corresponding to the frequency characteristic of the input signal. When a high group of the input signal is small, +LSB is output as the DFF. When a low group of the input signal is large, −LSB is output as the DFF.

The adder 141*g* adds the signal ALL output from the multiplier 141*e* to the signal ALLA stored in the tap 141*m*. Similarly, the adder 141*h* in the frequency integrating unit 143 adds DFF from the multiplier 141*f* to DFFA stored in the tap 141*n* and then outputs the result.

The ADD circuit 141*i* in the amplitude error integrating unit 142 implements an AND operation of an output signal from the adder 141*g* and [00FF] in hexadecimal notation. Thus, the lower eight bits in binary notation are extracted from the output signal from the adder 141*g*. In the same way, the AND circuit 141*k* implements an AND operation of a signal from the adder 141*g* and [FF00] in hexadecimal notation. Then, the upper eight bits are extracted from the output signal from the adder 141*g*.

Figure 22:
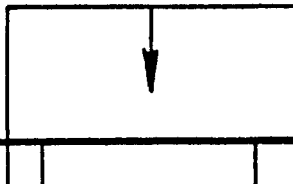
FIG. 22 is a diagram for explaining an operation of the major portion of the line equalizer control unit according to the present embodiment.

FIG. 22 is a diagram for explaining the process of the AND circuit 141*k*. That is, when the AND circuit 141*k* implements an AND operation of an input signal and [FF00] in hexadecimal notation, the AND result always becomes [0000] in the input signal ranging from [0000] to [00FF]. However, when the input signal ranges from [0100] to [7FFF], the AND result ranges from [0100] to [7F00]. Thus the upper eight bits of the input signal are extracted.

Similarly, when the input signal ranges from [FFFF] to [8000], the AND result ranges from [FF00] to [8000]. Thus the upper eight bits (in hexadecimal notation in FIG. 22) are extracted as shown in FIG. 22.

On the other hand, when the AND circuit 141*i* implements an AND operation of the input signal and [00FF], the AND result ranges from [0000] to [00FF] in the range of [0000] to [00FF]. That is, the same signal is output as the input signal. In the range of [0100] to [7FFF], the input signals [0000] to [00FF] are output sequentially and repeatedly.

The multiplier 141*q* multiplies the output from the AND circuit 141*k* by ½ and then outputs the numeral value obtained by halving the output from the AND circuit 141*k* (upper 8 bits).

In concrete, when the input signal ranges from [0000] to [00FF] as shown in FIG. 22, the upper eight bits of the AND result is [00]. The output of the multiplier 141*q* is [0000]. When the input signal is [0100], the multiplier 141*q* outputs [0080]. When the input signal is [FFFF], the output of the multiplier 141*q* becomes [FF80] (corresponding to the signal obtained by inverting the polarity of [0080]).

The adder 141*o* adds the output of the AND circuit 141*i* (the lower eight bits of the input signal) to the output of the multiplier 141*q* (½ of the upper eight bits of the input signal). As a result, when the input signal ranges from [0000] to [00FF], the adder 141*o* outputs the same value as the input signal from the adder 141*o* because the output of the multiplier 141q is [0000]. The output signal of the adder 141o is stored as ALLA into the tap 141m and is added to ALL (±LSB) sequentially input.

When the input signal is [0100], the output of the adder 141o becomes [0080]. When the input signal is [FFFF], the output of the adder 141o also becomes [0080]. [0080] is an intermediate value between [0000] and [00FF]. In such a manner, the value [0080] from the adder 141o is stored as ALLA into the tap 141m.

Since ±LSB is input to the adder 141g, the output of the adder varies about ±1 at a time. Hence, when the input signal from the adder 141g is not within the range covering from [0000] to [00FF] ([0100] or [FFFF]), [0080] is set as ALLA.

The range [0000] to [00FF] decides the adjustment width of the line equalizer 1. When the addition result of the adder 141a exceeds the above-described range, the output [0080] of the adder 141o is effected to pull back to the intermediate position thereof. Then the adding operation can be resumed from the intermediate position.

The range can be suitably selected. The range is decided by the number of respecitve upper bits and lower bits. For example, the range can be widened by reducing the number of the upper bits. In contrast, the range can be narrowed by increasing the number of upper bits.

An integrating circuit is formed of an adder 141g, AND circuits 141i and 141k, a tap 141m, a multiplier 141q, and an adder 141o. Another integrating circuit is formed of an adder 141h, AND circuits 141j and 141l, a tap 141n, and a multiplier 141r and an adder 141p. These integrating circuits can adjust their time constants according to the width of the the number of bits above-described.

The signal (ALL, DFF) to the integrating circuit is ±1. The addition value output from the adder 141g varies only ±1LSB at a time. The output from the integrating circuit is used to control the line equalizer at the rear stage. However, the variation of the line equalizer is suppressed by using a value as small as possible such as ±LSB, so that the operation of the line equalizer can be stabilized.

In other words, variations in amplitude of a signal output from the integrating circuit can be suppressed by setting the number of bits (bit data length) of a signal input to the integrating circuit as small as possible. As a result, it is possible to avoid a problem that large variations in operation of the line equalizer cause an unstable operation.

The multiplier 141s in the amplitude error integrating unit 142 multiplies the output of the AND circuit 141k by [0040] in hexadecimal notation. As a result, the multiplier 141s again outputs +LSB.

An integrating circuit, which is formed of an adder 141u, a square circuit 141w and a tap 141y, integrates again the output signal (+LSB) of the multiplier 141s and then outputs the result as a signal ALEQ (a coefficient A to be input to the line equalizer 1) showing an amplitude error.

In the frequency error integrating unit 143, another integrating circuit formed of an adder 141v, a square circuit 141x, and a tap 141z integrates the output signal (±LSB) and then outputs the result as a signal FLEQ showing a frequency characteristic error.

In such an arrangement, ALL (±LSB) is generated based on amplitude error information output from the first RLEQ control unit 130. Then the signal ALEQ showing an amplitude error can be generated based on the ±LSB. That is, the level of an input signal can be corrected by adjusting the coefficient of the line equalizer 1 at the rear stage by using the signal ALEQ.

In concrete, when +LSB is output as ALL, the coefficient of the line equalizer 1 which amplifies the level of the input signal is set. When −LSB is output as ALL, the coefficient of the line equalizer 1 which attenuates the level of the input signal is set.

In other words, when the level of the signal input to the first RLEQ control unit 130 is smaller than a reference value, the signal ALEQ output from the second ALEQ control unit 8 is amplified. When the level of the signal input to the first RLEQ control unit 130 is larger than the reference value, the signal output from the second ALEQ control unit 8 is attenuated.

Hence, the signal output from the multiplier 171 in the line equalizer 1 (refer to FIG. 7) is adjusted in level according to the amplitude of the signal ALEQ. In concrete, when the input signal to the first RLEQ control unit 130 is small, the output of the multiplier 171 becomes large. When the input signal to the first RLEQ control unit 130 is large, the output signal from the multiplier 171 is suppressed in value. In such a way, the multiplier 171 functions substantially as an AGC circuit by using an input amplitude error signal ALEQ.

The second RLEQ control unit 8 generates a DFF (±LSB) based on amplitude error information from the first RLEQ control unit 130 and then generates a signal FLEQ showing a amplitude error using the ±LSB. That is, the frequency characteristic of the input signal can be compensated by adjusting the coefficient of the rear-stage line equalizer 1 using the signal FLEQ.

In concrete, when +LSB is output as the DFF, the coefficient of the line equalizer 1 which amplifies the high group frequency signal based on the amplitude error signal FLEQ is set via the limiter 9 at the rear stage. When −LSB is output as the DFF, the coefficient of the line equalizer 1 which attenuates the high group frequency signal is set via the limiter 9.

Figure 23:
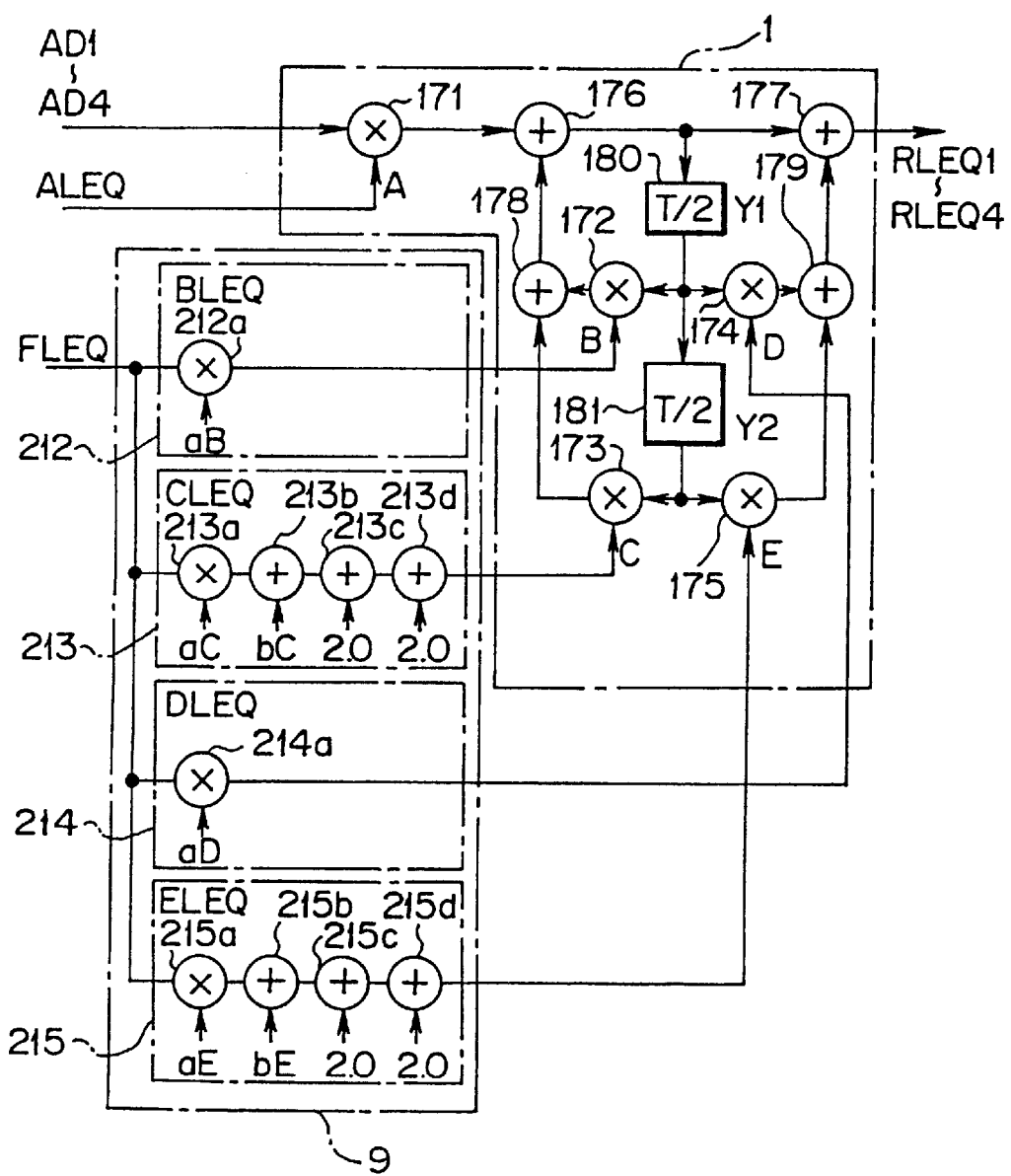
FIG. 23 is a diagram showing the equivalent circuit of the major portion of the line equalizer control unit according to the present embodiment.

Moreover, the limiter 9 shown in FIG. 3 or 9 has the configuration shown in detail in FIG. 23. That is, the limiter 9 shown in FIG. 23 sets coefficients B to E of the line equalizer 1 shown in FIG. 7, based on the signal FLEQ showing the amplitude error from the second RLEQ control unit (integrating circuit) 8. In order to set the coefficients B to E, the limiter 9 consists of a BLEQ unit 212, a CLEQ unit 213, a DLEQ unit 214 and an ELEQ unit 215.

Figure 24:
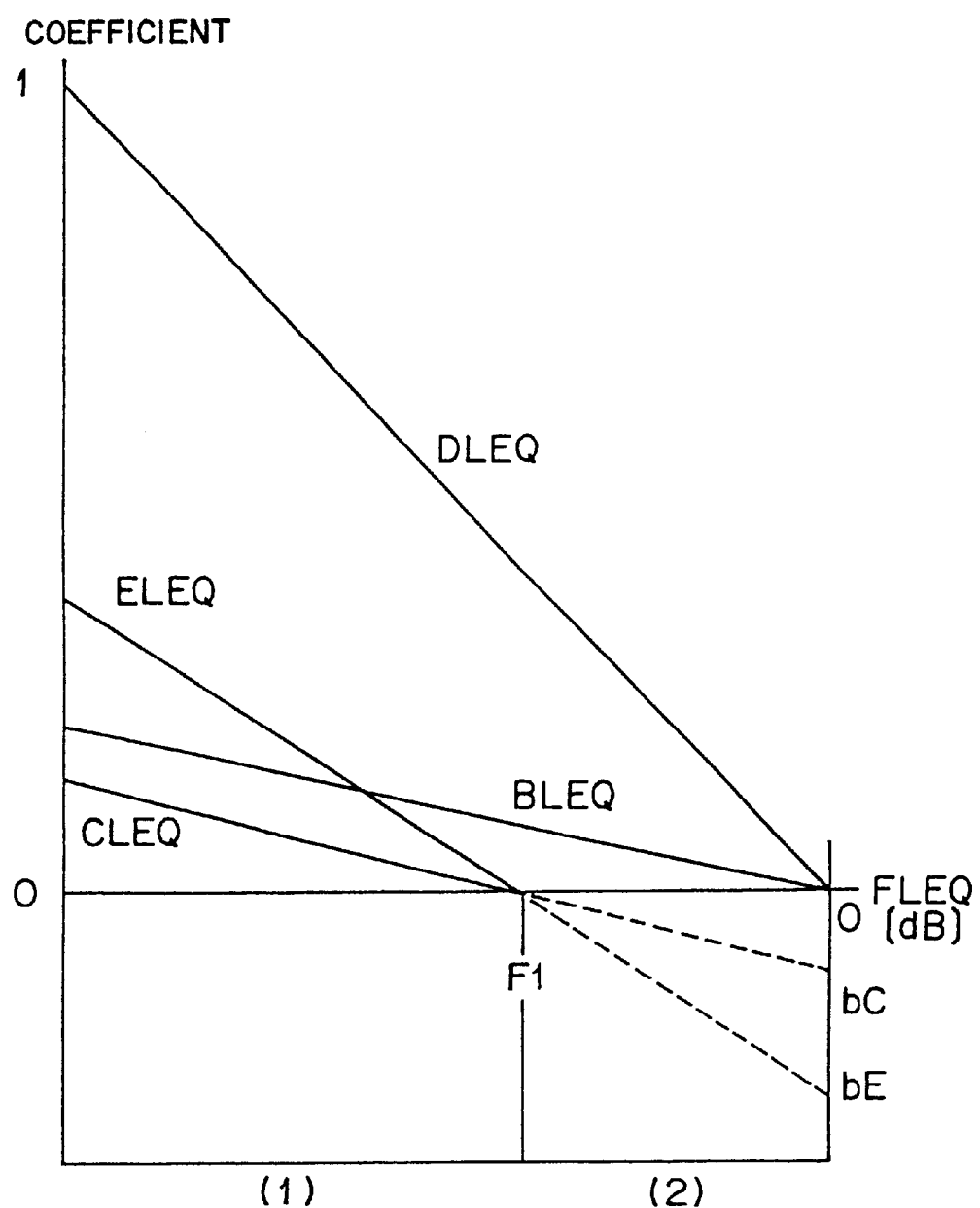
FIG. 24 is a diagram for explaining an operation of the major portion of the line equalizer control unit according to the present embodiment.

That is, in the limiter 9, the BLEQ unit 212 sets (or generates) a value of the coefficient B with the linear function characteristic shown in FIG. 24, based on the value of FLEQ input therein, and then outputs it. The CLEQ unit 213 sets (or generates) a value of the coefficient C with the linear function characteristic shown in FIG. 24, based on the value of FLEQ input therein, and then outputs it. The DLEQ unit 214 sets (or generates) a value of the coefficient C with the linear function characteristic shown in FIG. 24, based on the value of FLEQ input therein, and then outputs it. The ELEQ unit 215 sets (or generates) a value of the coefficient E with the linear function characteristic shown in FIG. 24, based on the value of FLEQ input therein, and then outputs it.

Referring to FIG. 24, the X-axis shows levels of FLEQ and includes the rightmost end of 0. The value of FLEQ increases along the X-axis in the left direction. As described above, FLEQ is a value corresponding to the difference between the low-group Nyquist frequency signal and the high-group Nyquist frequency signal. The Y-axis shows coefficient values and has the lowest end of 0. FIG. 24 illustrates that the coefficient value decreases (becomes negative) along the Y-axis in the upward direction.

The BLEQ unit 212 includes a multiplier 212a which multiplies the value of FLEQ by the value aB corresponding to the gradient α of a linear function (y=ax+b, where y corresponds to B and x corresponds to FLEQ). The coefficient value B output from the BLEQ unit 212 varies according to the value of FLEQ to be input, like the BLEQ shown in FIG. 26.

Similarly, the DLEQ unit 214 includes a multiplier 214a which multiplies the value of FLEQ by a value aD corresponding to the gradient a of the linear function (y=ax+b). The coefficient value D output from the DLEQ unit 214 varies according to the value of FLEQ to be input, like the DLEQ shown in FIG. 26.

On the other hand, as for the coefficient CLEQ, since the term corresponding to the constant b in the linear function (y=ax+b) is not zero, the CLEQ unit 213 includes an adder 213b, as well as a multiplier 213a. The multiplier 213a multiplies a FLEQ by a coefficient aC (the gradient of CLEQ). The adder 213b adds the result to the coefficient bC.

Similarly, as for the coefficient ELEQ, the term corresponding to the constant bB in the linear function (y=ax+b) is not zero. The ELEQ unit 215 includes an adder 215b, as well as a multiplier 215a. The multiplier 215a multiplies a FLEQ by the coefficient aE. The adder 215b adds the result to the coefficient bE.

It is needed to set the coefficients CLEQ and ELEQ to zero in the area (2) in FIG. 24. For that reason, the circuit which sets the coefficient value to zero in the area (2) is arranged in the CLEQ unit 213 and the ELEQ unit 215.

That is, the CLEQ unit 213 includes adders 213c and 213d, in addition to the multiplier 213a and the adder 213b. The adder 213c adds the output of the adder 213b to 2.0. The adder 213d adds the output of the adder 213c to −2.0.

Figure 25:
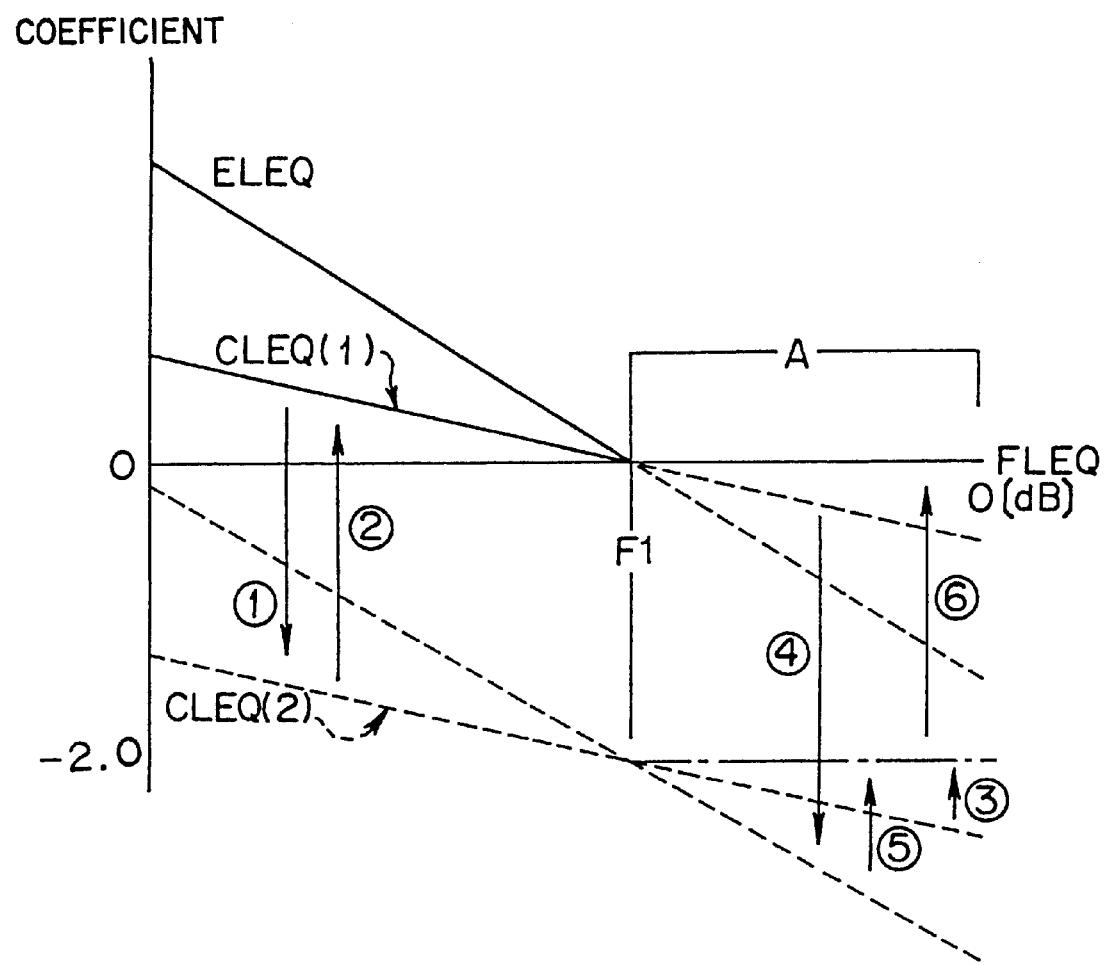
FIG. 25 is a diagram for explaining an operation of the major portion of the line equalizer control unit according to the present embodiment.

FIG. 25 is a diagram for explaining the function of the adders 213c and 213d.

The output of the adder 213b corresponds to CLEQ(1) in FIG. 25. In FIG. 25, doted lines represent the area where the coefficient value is to be zero. The output of the adder 213b is not zero in the area.

Figure 26:
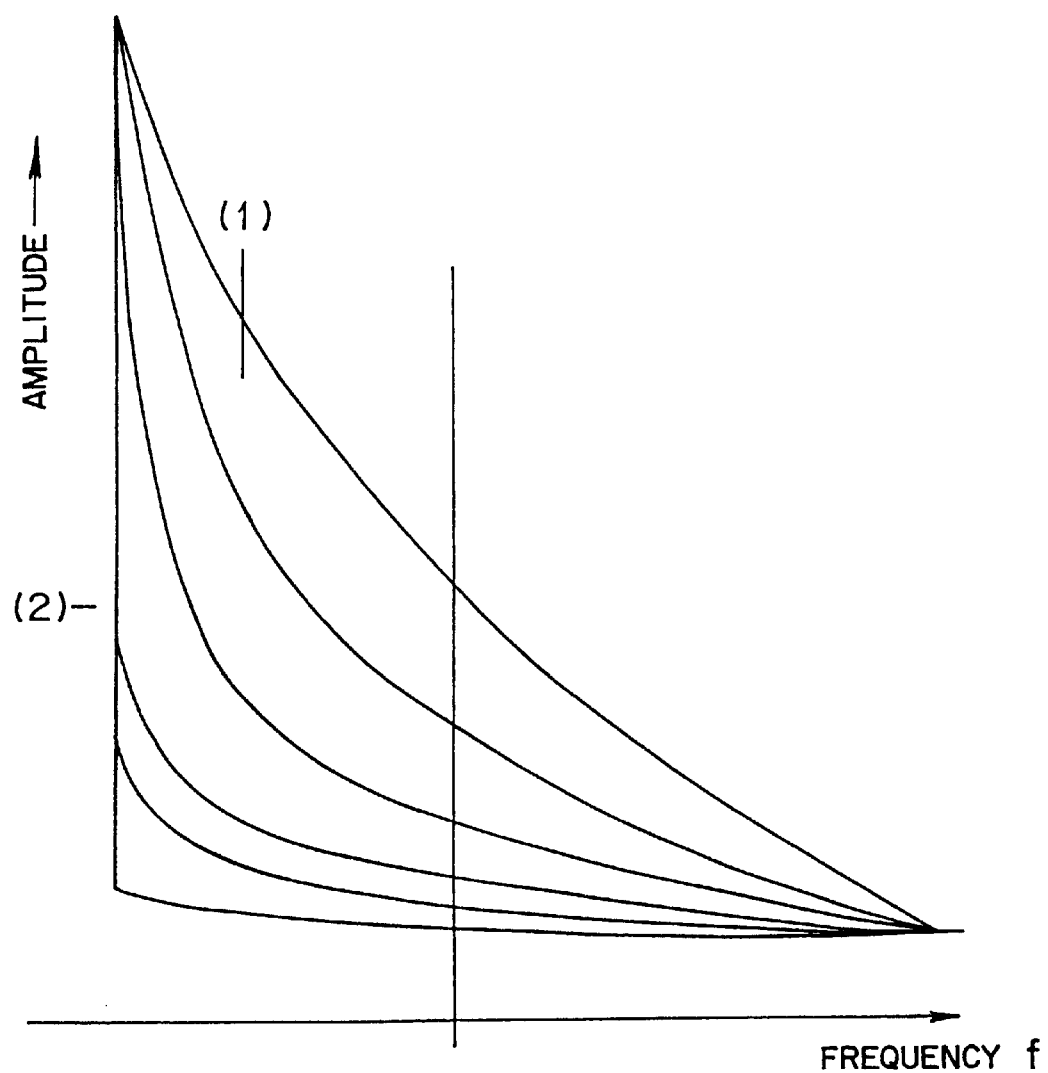
FIG. 26 is a diagram for explaining an operation of the major portion of the line equalizer control unit according to the present embodiment.

The adder 213c adds 2.0 to the output of the adder 213b to shift the output of the adder 213b, like CLEQ(2) in FIG. 26 (refer to the arrow (1) in FIG. 25). Next, when the adder 213d adds −2.0 to the output of the adder 213c, CLEQ(2) is again shifted to CLEQ(1) (refer to the arrow (2)).

Each of the line equalizer 1 and the limiter 9 consists of a DSP which covers numerals ranging from +2.0 to −2.0. Hence the signal is clipped at the area where the numeral value exceeds, for example, +2.0 (refer to the area A in FIG. 25).

That is, since the output of the adder 213b is zero or more at the area (A) in FIG. 25, the sum is over 2.0 to the output by adding 2.0 by the adder 213c. For that reason, the output of the adder 213c is clipped to 2.0 in the area (A) in FIG. 25 (refer to chained lines and the arrow (3)).

When the adder 213d adds −2.0 to the output of the adder 213c, the output of the adder 213d becomes zero in the area (A) in FIG. 25 in all cases. In this operation, the combination of the adder 213c and the adder 213d can set the value of the coefficient CLEQ to zero in the area where the line equalizer 1 is needed to operate as a first-degree HPF (refer to (2) in FIG. 24).

The ELEQ unit 215 includes adders 215c and 215d each of which has nearly the same function as those (numerals 213c and 213d) in the CLEQ unit 213. Like the CLEQ unit 213 (refer to arrows (4) to (6)), the coefficient value E can be set to zero in the area where the line equalizer 1 is needed to operate as a first-degree HPF (referred to (2) in FIG. 24).

That is, in FIG. 24, the area (1) is an area where the line equalizer 1 is operated as a second-degree HPF. The area (2) is an area where the line equalizer 1 is operated as a first-degree HPF. In the case of FLEQ=0, the line equalizer 1 is operated as a zero-degree HPF. In FIGS. 24 and 25, F1 is the point where the X-axis is divided into the area (1) and the area (2).

That is, when the line equalizer 1 is operated as a zero-degree HPF, each of the coefficients values B to E becomes zero. When the line equalizer 1 is operated as a first-degree HPF, the coefficient values B and D are respectively set to zero according to the value of FLEQ and the coefficient values C and E become zero. When the line equalizer 1 is operated as a second-degree HPF, the coefficient values B to E are set to zero according to the value of FLEQ.

As described above, since the limiter circuit 211 can generate the coefficient of the line equalizer 1 suitable for the frequency characteristic of an receive signal to vary the coefficient values BLEQ to ELEQ generated according to the value FLEQ to be input.

In other words, when being set to the values shown in FIG. 24, the coefficients BLEQ to ELEQ can be sequentially varied. Hence, the characteristic of the line equalizer 1 can be sequentially varied.

When the effect of the automatic gain control of the multiplier 171 in the line equalizer 1 is excluded from consideration, the line equalizer 1 according to the present embodiment has the frequency characteristic, for example, as shown in FIG. 26.

That is, as described above, the metallic trunk 44 generally tends to attenuate signals having high frequency component. But it is hard to attenuate signals having low frequency component, in comparison with the high frequency component. According to the present embodiment, it is needed for the line equalizer 1 to have the frequency characteristic as shown in FIG. 26 by setting the coefficients B to E sent from the limiter 9.

Particularly, since a long distance between the transmission modem 41 and the receiving modems 42 and 43 (or the physical length of the trunk 44) causes a large amount of attenuation of a high frequency component, the characteristic is set so as to increase the signal amplification amount as the frequency component of a receive signal increases. On the other hand, since the amount of attenuation of a low frequency component is small, the line equalizer 1 has the characteristic which does not amplify but attenuates the low frequency component.

As described above, by amplifying a high frequency component and attenuating a low frequency component by means of the line equalizer 1, the high frequency component can be balanced with the low frequency component. As a result, the frequency characteristic of an output signal can be flattened. It may be considered that the line equalizer 1 includes a high-pass filter (HPF) to provide the characteristic of attenuating low frequency component.

Signals having low frequency component are somewhat attenuated in the trunk. Since the whole level of a receive signal is adjusted by means of the signal level adjusting multiplier 171, the constituent elements (numerals 172 to 181) of the line equalizer other than the multiplier 171 operate merely to flatten the frequency characteristic of the signal.

The limiter 9 varies the filter characteristic according to the frequency characteristic of the signal input as shown in FIG. 26 by setting the coefficients B to E of the line equalizer 1. However, a fixed-point arithmetic DSP which enables a high rate process with a second-degree HPF can be used in the area (1).

In the area (2) requiring flat characteristic, the line equalizer 1 is sequentially changed into a second-degree HPF, a first-degree HPF and a zero-degree HPF by varying coefficients B to E according to the characteristic of an input signal, so that the frequency characteristic of the line equalizer 1 is varied.

In such an operation, it is not needed to set the multipliers 172 to 175 to a very large coefficient value, respectively. A high rate fixed-point arithmetic DSP can be used instead of the floating-point arithmetic DSP.

A first-degree filter shown in FIG. 8 can be formed by setting, for example, the coefficients C and E to "0" and substantially invalidating the operation of the lowest stage in the line equalizer 1 shown in FIG. 7. The zero-degree filter shown in FIG. 9 can be formed by setting, for example, the coefficients B and D to "0" and substantially invalidating the operation of the lowest stage and the middle stage in the line equalizer 1 shown in FIG. 7.

Figure 27:
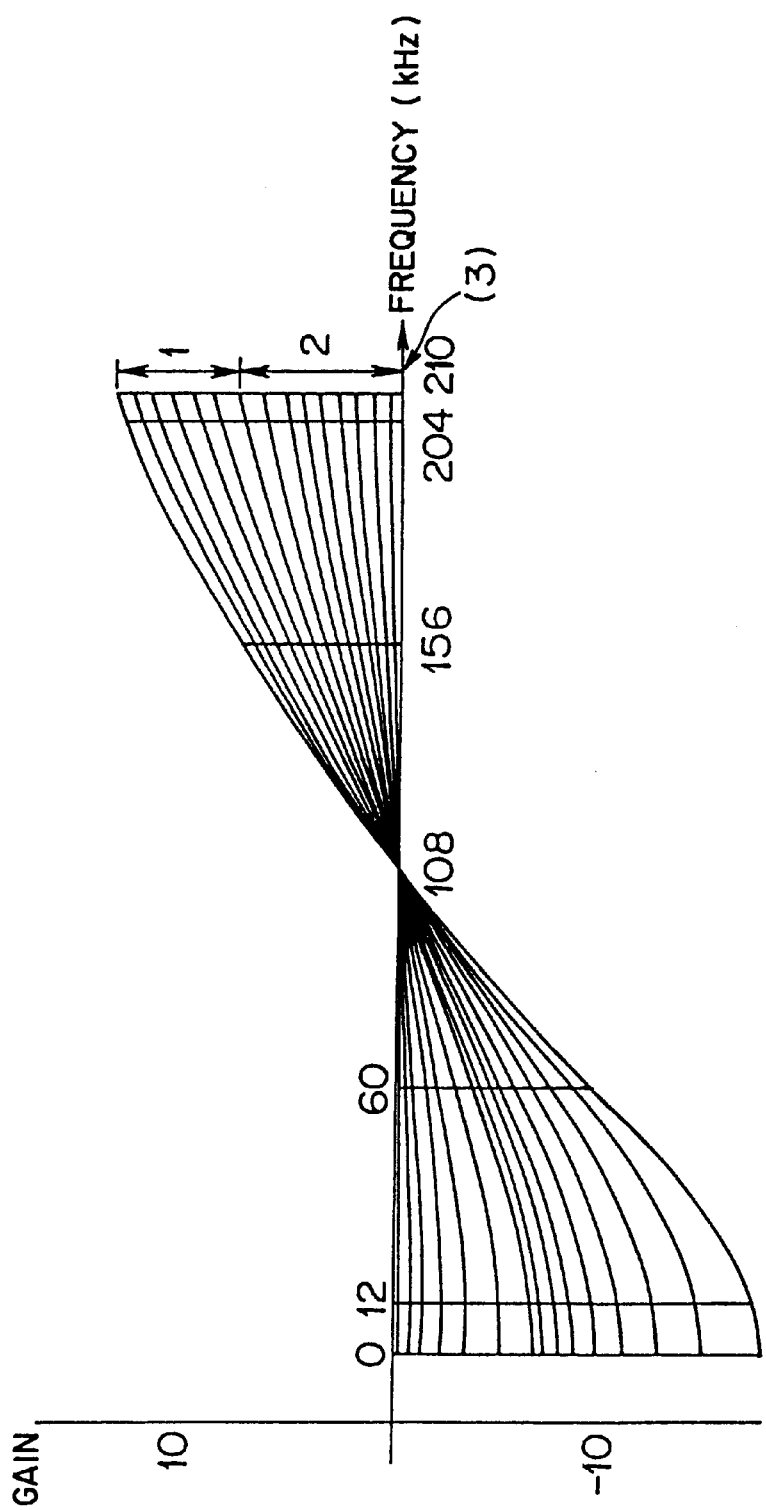
FIG. 27 is a diagram for explaining the operation of the major portion of the line equalizer control unit according to the present embodiment.

FIG. 27 is a diagram illustrating characteristic of the line equalizer 1 (but the multiplier 171 is not considered). In FIG. 27, the area (1) shows the characteristic in the case where the line equalizer 1 is operated as a second-degree HPF (refer to FIG. 7). The area (2) shows the characteristic in the case where the line equalizer 1 is operated as a first-degree HPF (refer to FIG. 8). The flat area (3) shows the characteristic in the case where the line equalizer 1 is operated as a zero-degree HPF (refer to FIG. 9).

The baud rate of the modem according to the present embodiment is 192 kHz. However, it is desirable that the process rate is decreased in an operable area to reduce the load on the DSP process.

For example, because processing is not needed for every baud rates, the process rate can be reduced under control of the line control equalizer 1 according to the present embodiment.

Hence, the first RLEQ control unit 130 and the second control unit RLEQ 8 according to the present embodiment execute a process at 12 kHz. This enables the load on the DSP process for line equalizer control to be reduced.

Figure 28:
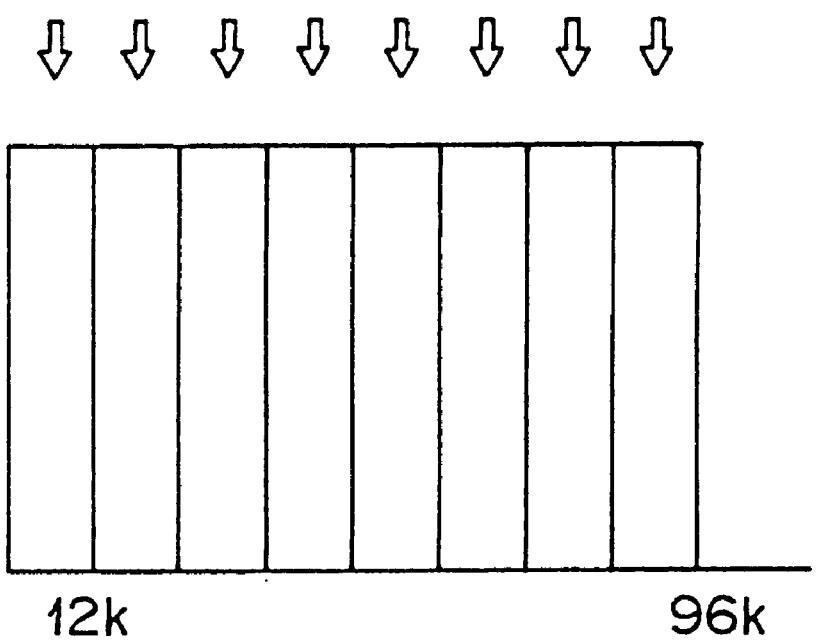
FIG. 28 is a diagram for explaining a random signal extracting process according to the present embodiment.

In that case, since the input signal has a cycle of 192 kHz, it must be extracted at a cycle of 12 kHz. FIG. 28 is a diagram for explaining a possible problem in the extracting operation.

The signal received by the modem has a band of ±96 kHz. It is necessary to observe the characteristic (amplitudes) of the whole band of the receive signal to control the characteristic of the line equalizer 1. In contrast, when the signal is extracted at 12 kHz intervals, only a partial band of the receive signal can be observed at a time.

When a signal with a 96 kHz band width is divided at 12 kHz intervals, the receive signal can be separated into 8. By observing only one of the sections of the signal divided at 12 kHz intervals, the extent of the amplitude thereof can be confirmed.

The whole characteristic of a receive signal are not uniform. There is a very strong possibility that some band has an amplitude larger or smaller than that in a confirmed section. However, controlling the characteristic of the line equalizer 1 based on the amplitude of a confirmed partial section makes it impossible to provide the frequency characteristic corresponding to the receive signal to the line equalizer 1.

For that reason, even if the receive signal is confirmed based on one of the sections divided at 12 kHz intervals, it is needed to recognize the whole tendency of the receive signal. For example, as shown in FIG. 29, a random extracting circuit 271 includes at the front stage of the band pass filter unit 4 shown in FIG. 9 to extract randomly the receive signal at 12 kHz intervals.

Figure 29:
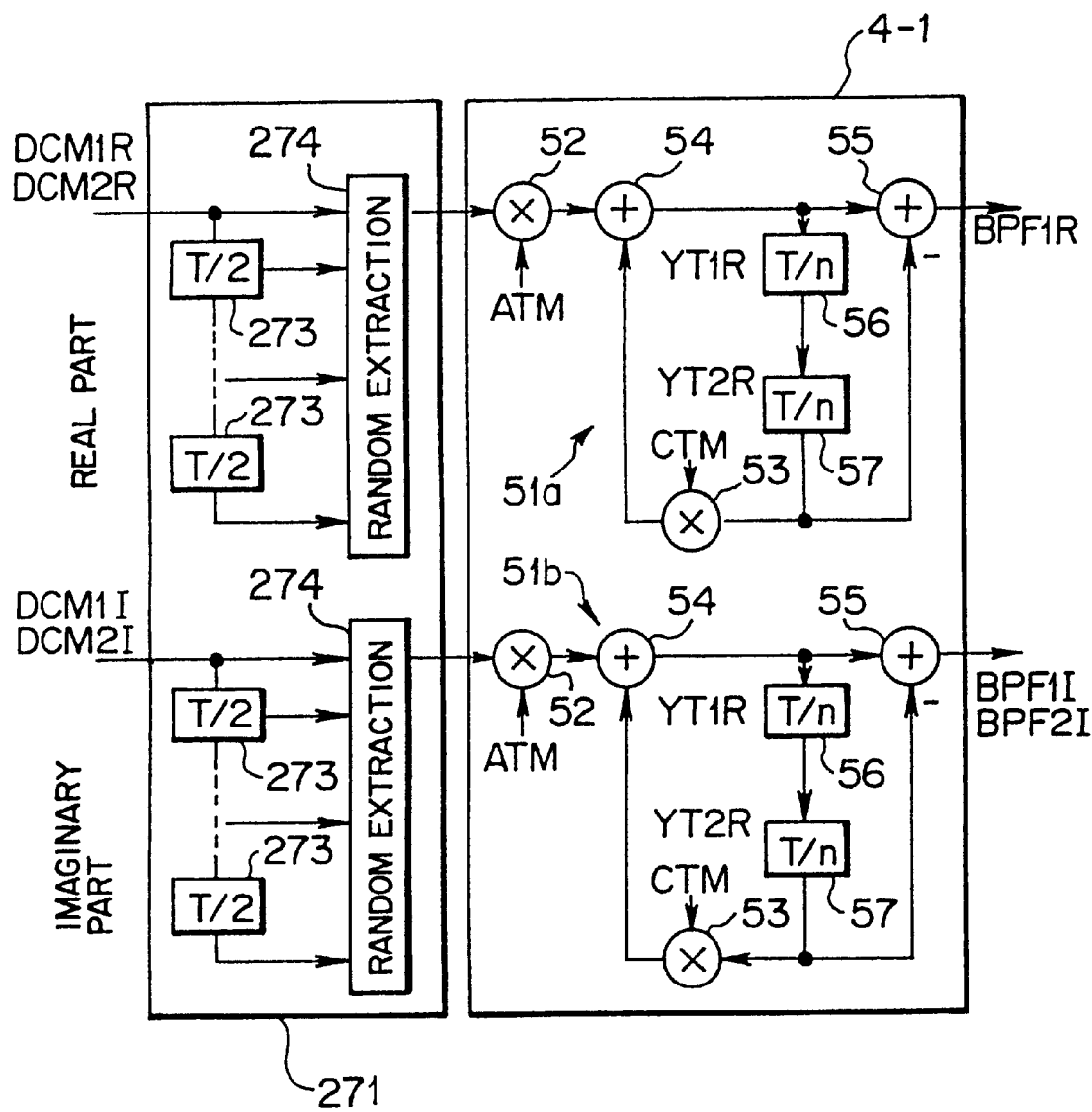
FIG. 29 is a diagram showing the equivalent circuit of the major portion of the line equalizer control unit according to the present invention.

That is, FIG. 29 is a diagram showing the random extracting circuit 271 and the bandpass filter 4-1 in the bandpass filter unit 4 connected thereto. The bandpass filter 4-1 is identical to that in FIG. 10.

The random extracting circuit 271 consists of taps 273 formed in a plural-staged connection for a real component of an input demodulated signal, taps 273 formed in a plural-staged connection for an imaginary component of the input demodulated signal, and a random extracting unit 274. The number of the connected taps 273 is as many as the number needed to input signals corresponding to the number of sample points for one period of FRM to the random extracting unit (with intermediate portions not shown). Use of the random extracting circuit 271 enables each of function units following the bandpass filter 4-1 in the line equalizer control unit 16 to execute a 12 kHz process.

Figure 30:
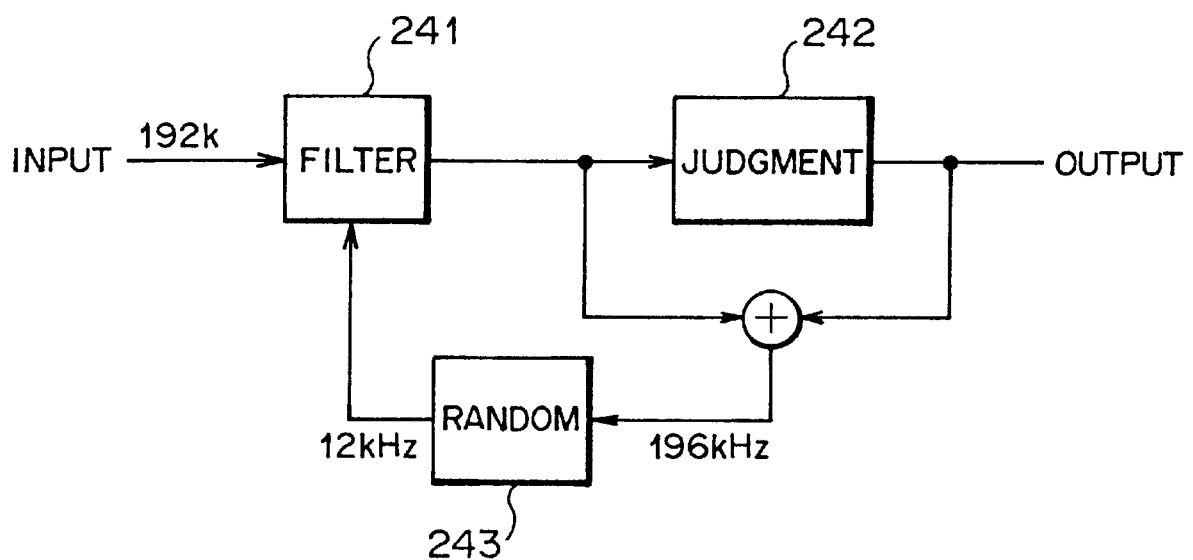
FIG. 30 is a diagram for explaining the random signal extracting process according to the present embodiment.

FIG. 30 is a diagram for explaining the concept of the random extraction by the random extracting circuit 271. In FIG. 30, numeral 241 corresponds to a filter (LEQ) acting as a line equalizer. Numeral 242 represents a judging unit which judges a signal point based on a receive signal. Numeral 243 represents a random extracting circuit which acts as the abovedescribed random extracting circuit 274.

The filter 241 receives an input signal of a frequency of 192 kHz. The random extracting circuit 243 outputs signals at 12 kHz intervals.

Figure 31:
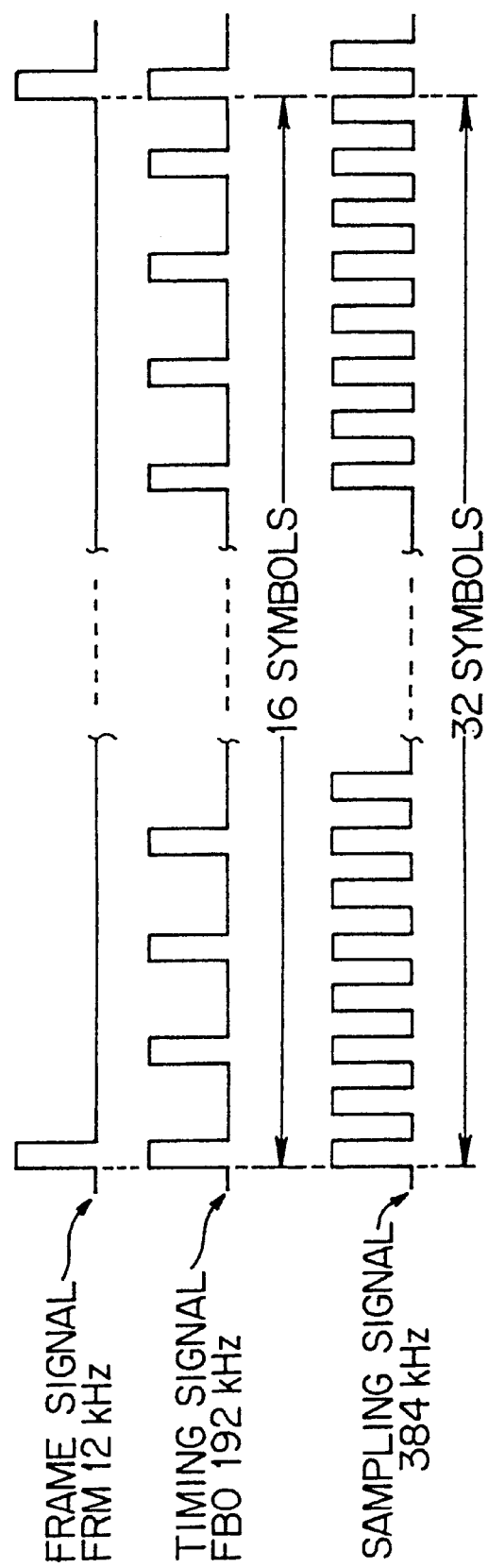
FIG. 31 is a timechart for explaining the random signal extracting process of the present embodiment.

FIG. 31 is a diagram showing the timing of each signal. In FIG. 31, FRM represents a frame signal which is generated at 12 kHz intervals. FBO represents a timing signal which is generated at 192 kHz intervals. FBO includes 16 symbols for one period of FRM. The sample signal, shown at the lowest stage, has a signal of 384 kHz, twice the repetitive cycle of FBO.

Since the sampling operation is performed 32 times in total for one period of FRM, four sample points per period extracted from an input signal are sufficient to execute eight random extracting operations.

Figure 32:
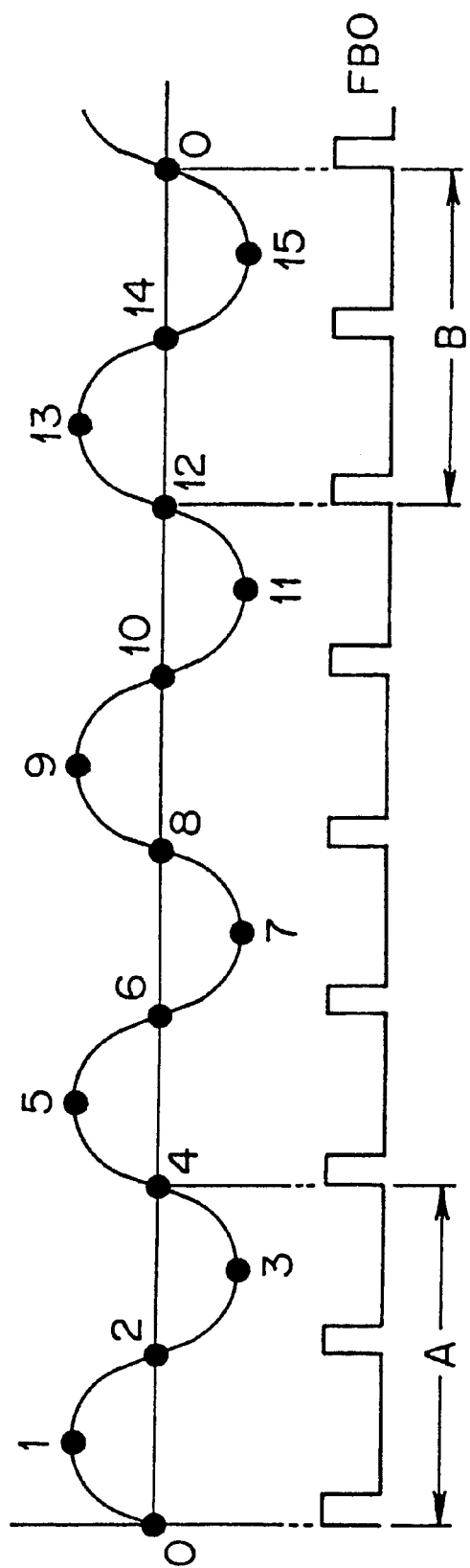
FIG. 32 is a timechart used for explaining the random signal extracting process of the present embodiment.
Figure 33:
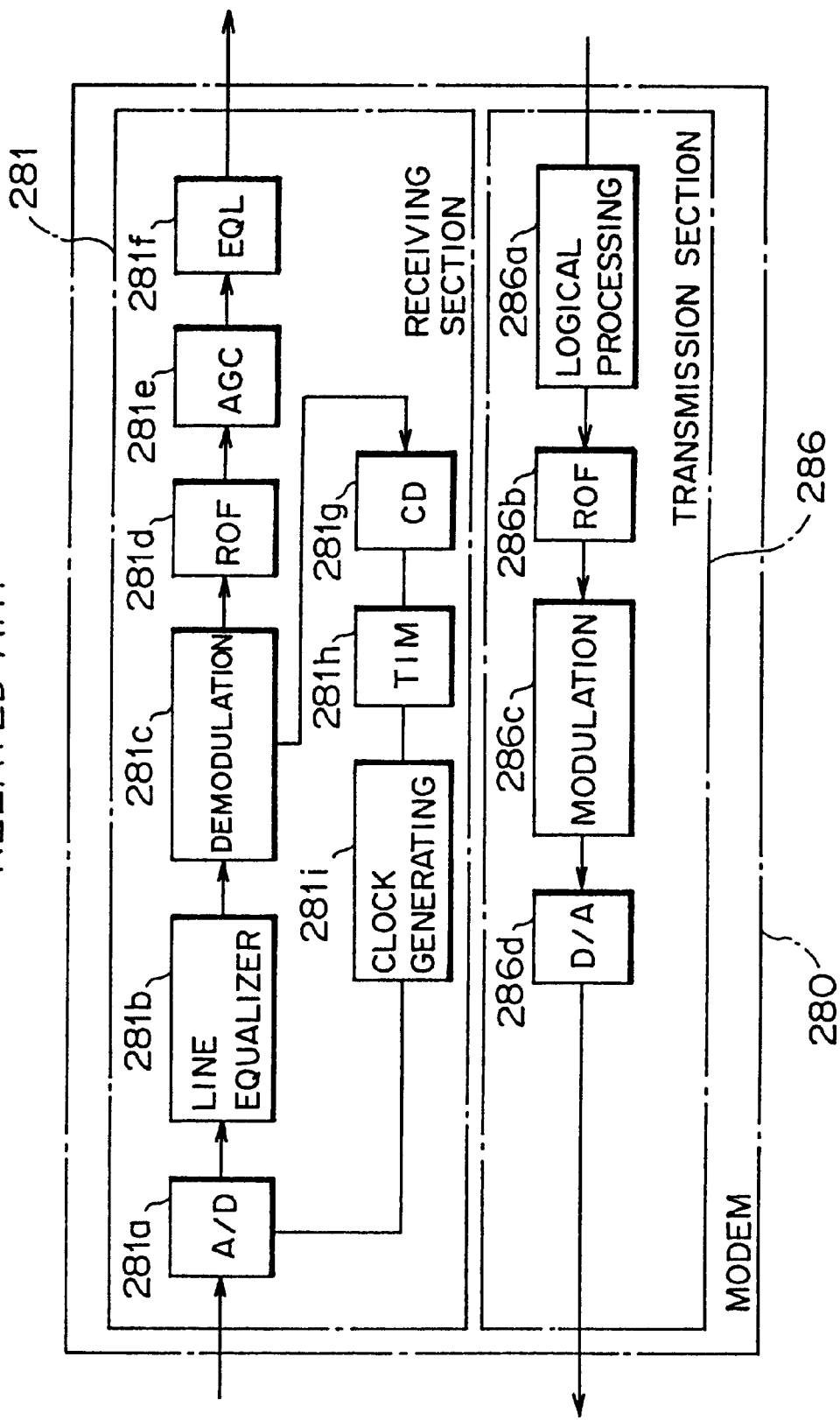
FIG. 33 is a diagram showing the configuration of the general modem.
Figure 34:
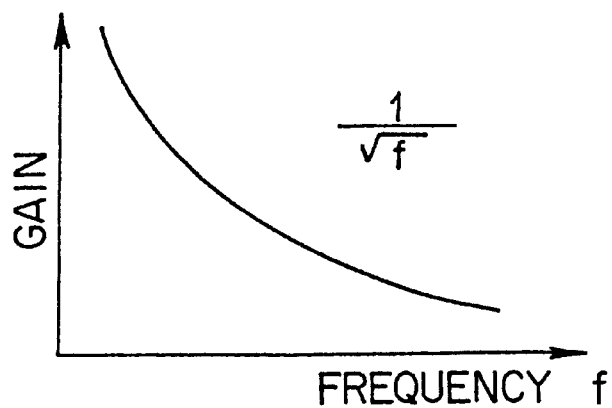
FIG. 34 is a diagram for explaining an operation of a line equalizer in the general modem.
Figure 35:
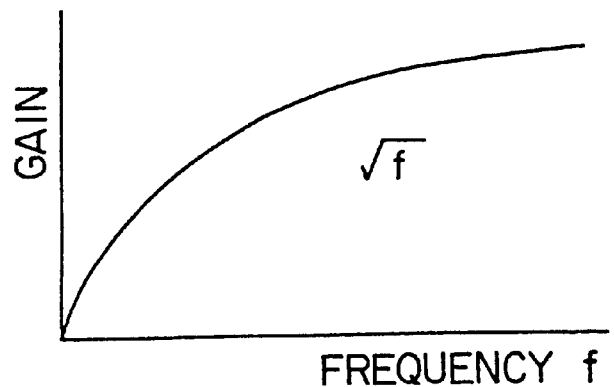
FIG. 35 is a diagram used for explaining the operation of the line equalizer in the general modem.

FIG. 32 is a diagram for explaining an input waveform random extracting operation. The input signal has a period of 96 kHz. The input signal is sampled four times per period.

After extraction of an input waveform for one period A, an input waveform for one period B is extracted in the same manner. In this case, the random extracting operation is performed to obtain waveforms continuously chained.

In such an operation, with the random extracting circuit 271 arranged at the front stage of the bandpass filter unit 4, the line equalizer 1 can be controlled at a frequency of 12 kHz lower than the frequency of the receive signal. As a result, the load on the DSP process can be reduced.

By adopting the above-mentioned configuration in the data communications system 40 employing a modem acting as a transmission device according to the embodiment of the present invention, the transmission modem 41 superimposes tone signals as the Nyquist frequency signals 32 and 33 on the transmission data 31 from a host equipment (not shown) as a transmission signal and then transmits the resultant transmission signal to the receiving modems 42 and 43 via the metallic trunk 44.

Each of the receiving modems 42 and 43 converts the receive signal (analog signal) into a digital signal (AD1 to AD4). Then, the line equalizer 1 improves the deteriorated amplitude characteristic of the receive signal, based on coefficient set information as feedback information from the line equalizer control unit 16 at the rear stage, substantially in the same way as that of the AGC circuit, as well as the frequency characteristic thereof, thus outputting the resultant signals (RLEQ1 to RLEQ4, refer to FIG. 23).

That is, the filter unit 4 in the line equalizer control unit 16 receives a receive signal from the line equalizer 1 via the demodulating unit 2 and the roll-off filter 3 and then extracts plural tone signals 32' and 33' each having a specific frequency component (Nyquist frequency component) superimposed on a transmission signal, from the receive signal.

The combination of the power arithmetic unit 5 and the adder 6 (first RLEQ control unit 130) judges the levels of the tone signals 32' and 33' extracted by the bandpass filter 4. The combination of the integrating circuit (second RLEQ control unit) 8 and the limiter 9 controls the characteristic of the line equalizer 1 which equalizes a receive signal by deciding the coefficients A to E based on the levels of the judged tone signals.

That is, by sequentially switching the filter characteristic to second-degree, first-degree, and zero-degree modes according to the characteristic needed in the line equalizer 1, the line equalizer control unit 16 can deal with the case where the process of the second-degree HPF requires a floating-point arithmetic operation, by using a fixed-point arithmetic operation. For that reason, a DSP can be used which performs a fixed-point arithmetic operation at a high arithmetic rate.

When the line equalizer 1 compensates changes in the frequency characteristic and the amplitude characteristic of the receive signal caused by trunk characteristic, the combination of the demodulating unit 2 and the roll-off filter 3 subjects the receive signal to a demodulating process and a roll-off filtering process. Then, a signal process is performed to identify the receive signal from the roll-off filter 3 by means of a rear-stage terminal.

As described above, according to the embodiment of the present invention, the line equalizer control unit 16 can automatically control the filter characteristic of the line equalizer 1 so as to changes sequentially to second-degree, first-degree, and zero-degree based on the level of the tone signal extracted from the receive signal. Hence, the present invention has the advantage of forming a device at a low manufacturing cost and performing a line equalizing process at a high processing rate with desired characteristic required according to the condition of a trunk.

Specifically, according to the present invention, the line equalizer 16 can vary the degree of the line equalizer 1 according to the characteristic of the receive signal. Hence, there is the advantage in that a DSP can be used which is inexpensive and performs a fixed-point arithmetic operation at a high rate to realize a line equalizer.

Furthermore, by using plural tone signals extracted from the receive signal, the line equalizer control unit 16 can calculate the average value of levels of the tone signals, thus confirming the degree of attenuation of the receive signal. The line equalizer 16 can also identify the frequency characteristic of a receive signal by calculating a difference in level among tone signals. As a result, the line equalizer 1 can be adjusted automatically, remarkably and easily.

The combination of the multiplier 171 in the line equalizer 1 and the line equalizer control unit 16 can control the amplitude of an input signal by multiplying a signal having a value corresponding to an amplitude error by the input signal. Hence, there is the advantage in that the process load on a DSP can be reduced by simplifying the circuit configuration because it is not needed to arrange a different AGC circuit.

Moreover, the first RLEQ control unit 130 can set the coefficient of the line equalizer 1 based on amplitude error information and the frequency error information on the receive signal calculated based on Nyquist frequency signals continuously transmitted, and then can vary the characteristic. Hence, the line equalizer 1 can compensate the amplitude error and frequency error. In addition, since an exchange of training signals can be neglected before the starting of a data transmission, the period until the starting of a data transmission can be shortened.

The integrating circuit 8 which can pull back to a center point in a predetermined range when the accumulated value exceeds the range can be realized by extracting the upper bits and the lower bits of an n digit (bit) signal, adding ½ of the upper bits to the lower bits, and feeding back the result. The above-mentioned integrating circuit applied to the integrating circuit 8 in each of the modems 42 and 43 can suppress the varied width of an output signal to a suitable value. Hence, there is the advantage of stabilizing the operation of the line equalizer 1.

Furthermore, the frequency shift unit 4-2 can perform a frequency shift process by means of a simple signal process of merely adding the earlier signal to the later signal, thus enabling to neglect the complicated signal process. The frequency shift function can be realized which is more advantageous than the conventional frequency shift function in circuit scale, process time, and the like. Applying the frequency shift unit 4-2 to the modems 42 and 43 contributes largely to a decrease of load on the DSP signal process, a decrease in process time, and the like. Moreover, the frequency shift process can be realized which is more advantageous than the general frequency shift process in circuit scale, process time, and the like.

What is claimed is:

1. A line equalizer control method comprising:

an extracting step of extracting plural tone signals superimposed on a transmission signal, said plural tone signals each having a specific frequency component;

a calculating step of calculating amplitudes of said extracted tone signals and differences in amplitudes between said tone signals;

a controlling step of controlling characteristic of a line equalizer which equalizes a receive signal, based on the differences of amplitudes and the polarities of said tone signals.

2. The line equalizer control method according to claim 1, further comprising the step of:

extracting said plural tone signals including a tone signal having an upper-limit frequency component in a certain band and a tone signal having a lower-limit frequency component in said band, in said extracting step.

3. The line equalizer control method according to claim 1, further comprising the steps of:

comparing a value obtained by adding said extracted plural signals together, with a reference value, in said calculating step; and controlling the characteristic of said line equalizer, based on said value and the magnitude thereof obtained by comparing said tone signals with said reference value, in said controlling step.

4. A line equalizer control method comprising the steps of:

extracting each of plural signals included in a receive signal, said plural signals each having a specific frequency component;

calculating an amplitude of a specific frequency signal of each of said extracted signals;

calculating differences in amplitude between said tone signals in said calculating step:

controlling the characteristic of said line equalizer based on the values of said amplitude differences and the polarities thereof;

calculate a coefficient which decides a characteristic of a line equalizer based on the amplitude of each of said calculated specific frequency signals;

controlling said coefficient to be calculated based on the characteristic of a receive signal represented by the amplitude of said specific frequency signal; and then switching a degree of said line equalizer.

5. An integrating circuit comprising:

a first extracting unit for extracting lower m digits from an n digit signal;

a second extracting unit for extracting upper (n−m) digits from said n digit signal;

a multiplier for halving a signal output from said second extracting unit;

a first adder for adding an output from said first extracting unit to an output from said multiplier;

a storage unit for temporarily storing the output from said first adder; and a second adder for adding a signal stored in said storage unit to an n digit signal to be input.

6. A transmission device which has a receiving section which receives as a receive signal a transmission signal to which plural tone signals each having a specific frequency component are superimposed, said receiving section comprising:

a line equalizer for equalizing said receive signal;

a line equalizer control unit for controlling said line equalizer in a feedback mode based on differences of amplitudes and polarities of said tone signals included in an output signal from said line equalizer;

a bandpass filter unit for extracting a signal having a specific frequency component from an output signal from said line equalizer;

a level calculating unit for calculating an amplitude of each of plural specific frequency signals extracted by said bandpass filter unit and calculating differences in amplitude between said specific frequency signals; and a coefficient calculating unit for calculating a coefficient which decides a characteristic of said line equalizer based on the value of said amplitude calculated by said level calculating unit.

7. A transmission device which has a receiving section which receives as a receive signal a transmission signal to which plural tone signals each having a specific frequency component are superimposed, said receiving section comprising:

a line equalizer for equalizing said receive signal;

a calculator for calculating levels of tone signals and calculating differences in amplitude between said tone signals in said calculating step;

a line equalizer control unit for controlling said line equalizer in a feedback mode based on differences of amplitudes and polarities of said tone signals included in an output signal from said line equalizer; and wherein said line equalizer is formed so as to operate as a second-degree, first-degree, or zero-degree filter under feedback control of said line equalizer control unit.

8. A transmission device which has a receiving section which receives as a receive signal a transmission signal to which plural tone signals each having a specific frequency component are superimposed, said receiving section comprising:

a line equalizer for equalizing said receive signal;

a calculator for calculating levels of tone signals and calculating differences in amplitude between said tone signals;

a line equalizer control unit for controlling said line equalizer in a feedback mode based on differences of amplitudes and polarities of said tone signals included in an output signal from said line equalizer; and wherein said line equalizer control unit is formed so as to perform an automatic gain control on said receive signal, through a feedback control on said line equalizer.

9. A transmission device which has a receiving section which receives as a receive signal a transmission signal to which plural tone signals each having a specific frequency component are superimposed, said receiving section comprising:

a line equalizer for equalizing said receive signal;

a line equalizer control unit for controlling said line equalizer in a feedback mode based on differences of amplitudes and polarities of said tone signals included in an output signal from said line equalizer;

a random extracting circuit arranged at the front stage of said line equalizer control unit, for randomly extracting an output signal from said line equalizer; and a calculator for calculating differences in amplitude between tone signals.

10. A transmission device which has a receiving section which receives as a receive signal a transmission signal to which plural tone signals each having a specific frequency component are superimposed, said receiving section comprising:

a line equalizer for equalizing said receive signal;

a calculator for calculating levels of tone signals and differences in amplitude between said tone signals;

a line equalizer control unit for controlling said line equalizer in a feedback mode based on differences of amplitude and polarities of said tone signals included in an output signal from said line equalizer; and a bandpass filter unit including:

a bandpass filter for extracting plural specific frequency signals from a receive signal;

a frequency shift unit for shifting said plural specific frequency signals extracted by said bandpass filter by a predetermined frequency component; and a low-pass filter for extracting at least one of said plural specific frequency signals from said frequency shift unit.

11. The transmission device according to claim 10, wherein a combination of said frequency shift unit and said low-pass filter comprises a frequency shift and low-pass filter sharing unit including:

a first storage unit for temporarily storing a real component of an input signal and then outputting the same after one period of timing;

a second storage unit for temporarily storing an imaginary component of said input signal and then outputting the same after one period of timing;

a first adder for adding the real component input one period of timing before stored in said first storage unit, to said imaginary component to be input; and a second adder for adding the imaginary component input one period of timing before stored in said second storage unit, to said real component to be input.

12. A transmission device which has a receiving section which receives as a receive signal a transmission signal to which plural tone signals each having a specific frequency component are superimposed, said receiving section comprising:
  a line equalizer for equalizing said receive signal;
  a calculator for calculating levels of tone signals and calculating differences in amplitude between said tone signals;
  a line equalizer control unit for controlling said line equalizer in a feedback mode based on differences of amplitude and polarities of said tone signals included in an output signal from said line equalizer; and
  a level calculating unit including:
  a full-power calculating unit for calculating a level of an intermediate band signal in transmission data by calculating the sum of plural specific frequency signals extracted by a bandpass filter unit; and
  a power differential calculating unit for calculating the power difference plural specific frequency signals extracted by said bandpass filter unit.

13. A transmission device which has a receiving section which receives as a receive signal a transmission signal to which plural tone signals each having a specific frequency component are superimposed, said receiving section comprising:
  a line equalizer for equalizing said receive signal;
  a calculator for calculating levels of tone signals and calculating differences in amplitude between said tone signals:
  controlling the characteristic of said line equalizer based on the values of said amplitude differences and the polarities thereof, in said controlling step;
  a line equalizer control unit for controlling said line equalizer in a feedback mode based on amplitudes and polarities of said tone signals included in an output signal from said line equalizer; and
  a coefficient calculating unit for calculating a coefficient for deciding a characteristic of said line equalizer, said coefficient calculating unit including:
  a comparing unit for comparing power information of the signal level calculated by a level calculating unit with a reference value set in advance;
  an integrating circuit for integrating a comparison result from said comparing unit; and
  a limiter for calculating a coefficient to control said line equalizer, based on an integration result from said integrating circuit.

14. The transmission device according to claim 13, wherein said integrating circuit comprises:
  a first extracting unit for extracting lower m digits from an n digit signal;
  a second extracting unit for extracting upper (n−n) digits from said n digit signal;
  a multiplier for halving a signal output from said second extracting unit;
  a first adder for adding an output from said first extracting unit to an output from said multiplier;
  a storage unit for temporarily storing the output from said first adder; and
  a second adder for adding the signal stored in said storage unit to an n digit signal to be input.

* * * * *